United States Patent
Veit et al.

(10) Patent No.: US 7,117,988 B2
(45) Date of Patent: Oct. 10, 2006

(54) POSITIVE DISPLACEMENT SORTER

(75) Inventors: Frank W Veit, Spring Lake, MI (US);
Rhonda J Verploegen, Sparta, MI (US); Thanh V Nguyen, Wyoming, MI (US); Mark S Harkema, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/057,010

(22) Filed: Feb. 11, 2005

(65) Prior Publication Data
US 2005/0133345 A1 Jun. 23, 2005

Related U.S. Application Data

(62) Division of application No. 10/248,981, filed on Mar. 6, 2003, now Pat. No. 6,860,383.

(60) Provisional application No. 60/446,048, filed on Feb. 7, 2003, provisional application No. 60/368,881, filed on Mar. 29, 2002, provisional application No. 60/362,415, filed on Mar. 7, 2002.

(51) Int. Cl.
*B65G 17/16* (2006.01)
*B65G 17/32* (2006.01)
*B65G 47/46* (2006.01)
*B65G 15/60* (2006.01)

(52) U.S. Cl. ............... 198/802; 198/370.02; 198/838

(58) Field of Classification Search ........... 198/370.02, 198/802, 838
See application file for complete search history.

(56) References Cited

U.S. PATENT DOCUMENTS

| | | | |
|---|---|---|---|
| 2,648,423 A | 8/1953 | Black | 198/833 |
| 3,361,247 A | 1/1968 | Lauzon et al. | 198/38 |
| 3,426,887 A | 2/1969 | Ward et al. | 198/177 |

(Continued)

FOREIGN PATENT DOCUMENTS

DE 3412995 A1 10/1985

(Continued)

OTHER PUBLICATIONS

Title: Conveyor System With Lateral Motion Capability, (Inventor: A. Kimura), Oct. 1986, Japan.

*Primary Examiner*—Gene O. Crawford
*Assistant Examiner*—Leslie A. Nicholson, III
(74) *Attorney, Agent, or Firm*—Van Dyke, Gardner, Linm & Burkhart, LLP

(57) ABSTRACT

A positive displacement sorter includes a plurality of interconnected slats defining an endless web, an upper run of the web defining a conveying surface conveying articles in a longitudinal direction. A plurality of pusher shoes move along the slats to laterally displace articles on the conveying surface. The pusher shoes include a base and a member extending from the base below the conveying surface. At least one diverting rail extends diagonally under the conveying surface and at least one diverter is associated with the at least one diverting rail. The at least one diverter includes an actuator that selectively actuates the member toward at least one diverting rail. The at least one diverting rail has a terminal portion opposite the at least one diverter. The terminal portion includes an upper surface engaging an upper portion of the member and a lower surface engaging a lower portion of the member. The upper and lower surfaces direct the member in the longitudinal direction. This causes the member to move to the longitudinal direction in a continuous motion thereby reducing audible noise produced with conventional diverting rails when the member strikes the side rail of the sorter at the end of the divert.

20 Claims, 25 Drawing Sheets

U.S. PATENT DOCUMENTS

| | | | | |
|---|---|---|---|---|
| 3,647,050 A | 3/1972 | Neal | | 198/815 |
| 3,788,447 A | 1/1974 | Stephanoff | | 198/41 |
| 3,807,314 A | 4/1974 | Siemmons | | 104/148 R |
| 4,138,008 A | 2/1979 | Del Rosso | | 198/365 |
| 4,526,271 A | 7/1985 | Finnighan | | 198/648 |
| 4,576,276 A | 3/1986 | Boltrek et al. | | 198/332 |
| 4,675,582 A | 6/1987 | Hommes et al. | | 318/38 |
| 4,717,011 A | 1/1988 | Yu et al. | | 198/365 |
| 4,732,259 A | 3/1988 | Yu et al. | | 198/365 |
| 4,732,260 A | 3/1988 | Canziani | | 198/365 |
| 4,738,347 A * | 4/1988 | Brouwer et al. | | 198/370.02 |
| 4,760,908 A | 8/1988 | Houghton | | 198/365 |
| 4,770,291 A | 9/1988 | Shaw | | 198/851 |
| 4,800,818 A | 1/1989 | Kawaguchi et al. | | 104/290 |
| 4,817,779 A * | 4/1989 | Beck et al. | | 198/370.02 |
| 4,896,760 A * | 1/1990 | Triantafilou et al. | | 198/370.02 |
| 4,932,515 A | 6/1990 | Stohr | | 198/822 |
| 4,973,892 A | 11/1990 | Murata et al. | | 318/135 |
| 5,038,912 A | 8/1991 | Cotter | | 198/370 |
| 5,088,593 A | 2/1992 | Lewin | | 198/619 |
| 5,127,510 A | 7/1992 | Cotter et al. | | 198/372 |
| 5,131,522 A * | 7/1992 | Fujio | | 198/370.02 |
| 5,165,515 A | 11/1992 | Nitschke et al. | | 198/349.95 |
| 5,167,315 A | 12/1992 | Doane | | 198/362 |
| 5,172,803 A | 12/1992 | Lewin | | 198/619 |
| 5,191,959 A * | 3/1993 | Leemkuil | | 198/370.02 |
| 5,199,548 A | 4/1993 | Tanaka et al. | | 198/502.4 |
| 5,218,277 A | 6/1993 | Pattison et al. | | 318/135 |
| 5,285,886 A | 2/1994 | Ostholt et al. | | 198/370 |
| 5,295,568 A | 3/1994 | Saito et al. | | 198/330 |
| 5,333,715 A | 8/1994 | Sapp | | 198/372 |
| 5,409,095 A * | 4/1995 | Hoshi et al. | | 198/370.13 |
| 5,427,223 A | 6/1995 | van den Goor | | 198/365 |
| 5,435,429 A | 7/1995 | van den Goor | | 198/890.1 |
| 5,588,520 A | 12/1996 | Affaticati et al. | | 198/370.06 |
| 5,613,591 A | 3/1997 | Heit et al. | | 198/370.02 |
| 5,657,858 A | 8/1997 | van den Goor | | 198/890 |
| 5,732,814 A * | 3/1998 | Owczarzak et al. | | 198/890 |
| 5,909,797 A | 6/1999 | van den Goor | | 198/370.02 |
| 5,927,466 A | 7/1999 | Rowley | | 198/370.03 |
| 5,967,289 A | 10/1999 | Kelsey | | 198/370.02 |
| 5,975,277 A | 11/1999 | Skarlupka | | 198/370.04 |
| 6,139,240 A | 10/2000 | Ando | | 414/267 |
| 6,292,710 B1 | 9/2001 | Bonnet | | 700/230 |
| 6,481,559 B1 * | 11/2002 | Maeda et al. | | 198/370.02 |
| 6,513,642 B1 | 2/2003 | Shearer et al. | | 198/370.02 |
| 6,513,649 B1 | 2/2003 | Lauzon et al. | | 198/832.1 |
| 6,615,972 B1 | 9/2003 | Veit et al. | | |
| 6,814,216 B1 | 11/2004 | Veit et al. | | |

FOREIGN PATENT DOCUMENTS

| | | |
|---|---|---|
| DE | 2745298 C2 | 1/1987 |
| DE | 4342851 C2 | 9/1995 |
| DE | 19852926 A1 | 5/2000 |
| EP | 0212027 | 3/1987 |
| EP | 0444734 B1 | 5/1994 |
| EP | 0700844 A2 | 3/1996 |
| EP | 0602694 | 3/1998 |
| EP | 0648694 B1 | 12/1998 |
| EP | 0792824 | 7/2000 |
| GB | 2057381 A | 4/1981 |
| GB | 2242409 A | 10/1991 |
| JP | 57-112223 | 7/1982 |
| JP | 2-86923 | 7/1990 |
| JP | 4-223921 | 8/1992 |
| JP | 07-61570 | 3/1995 |
| JP | 7-315561 | 12/1995 |
| JP | 7-323911 | 12/1995 |
| JP | 820429 | 1/1996 |
| JP | 8-319021 | 12/1996 |
| JP | 9-52621 | 2/1997 |
| JP | 9-110149 | 4/1997 |
| JP | 9-183517 | 7/1997 |
| JP | 9-183518 | 7/1997 |
| JP | 9-290914 | 11/1997 |
| JP | 11-193128 | 7/1999 |
| JP | 0-103518 | 4/2000 |
| JP | 0-118699 | 4/2000 |
| WO | WO00/41956 | 7/2000 |
| WO | 00/48739 | 8/2000 |
| WO | 00/68125 | 11/2000 |
| WO | WO01/83342 | 11/2001 |

* cited by examiner

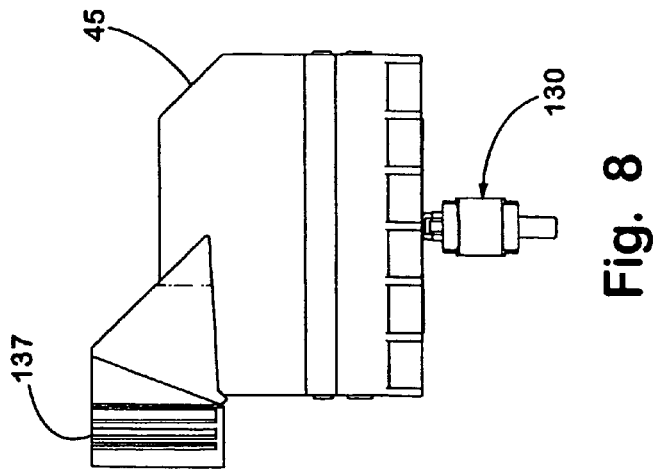
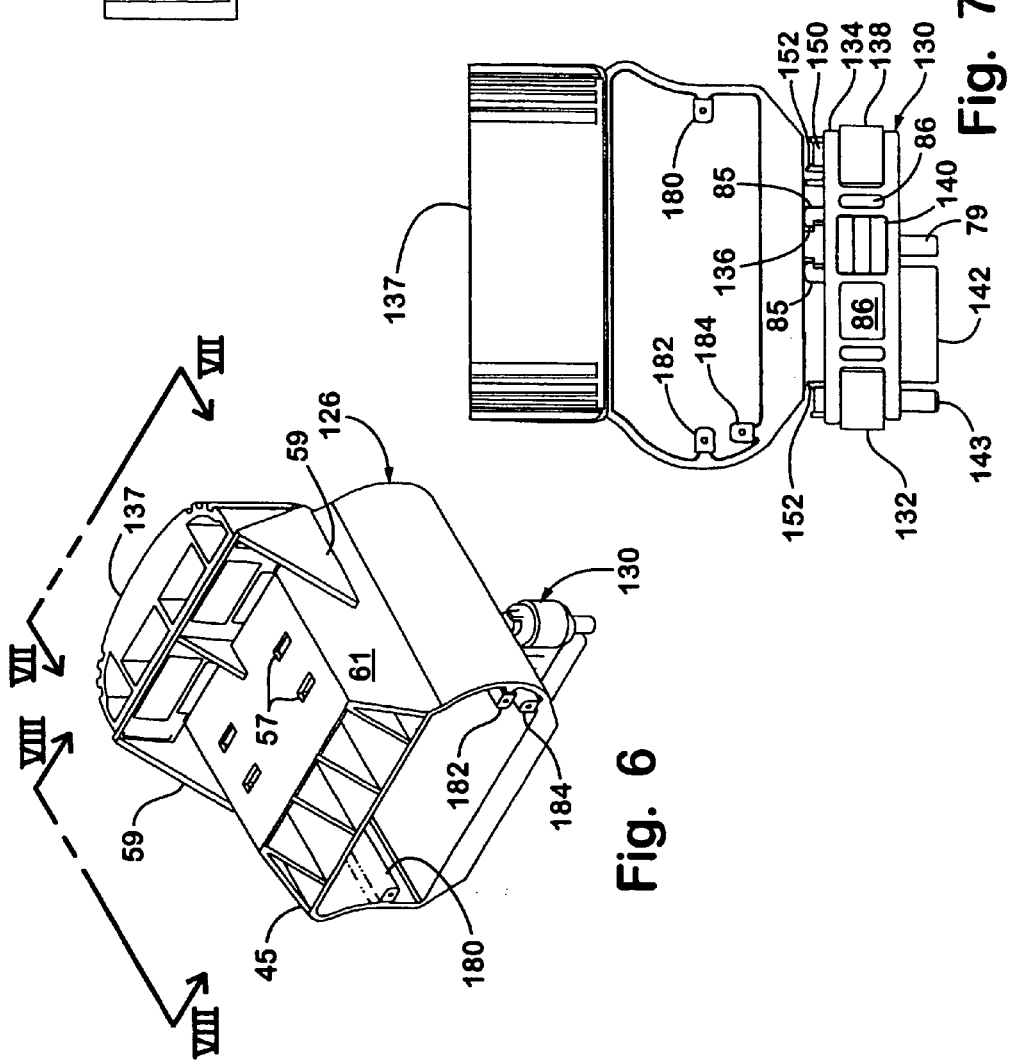

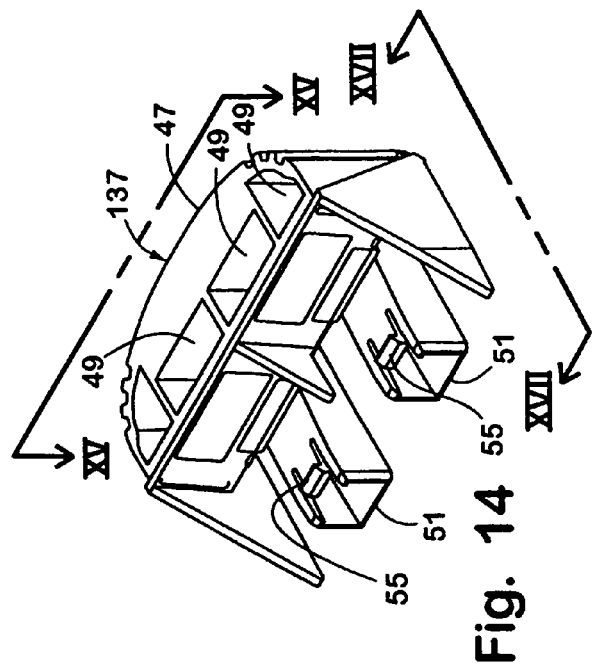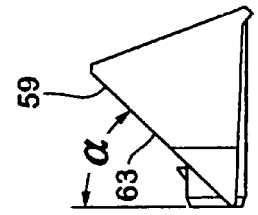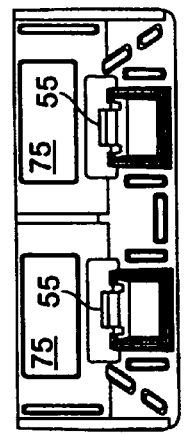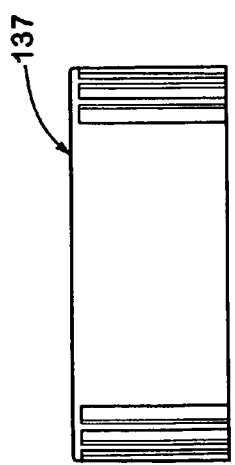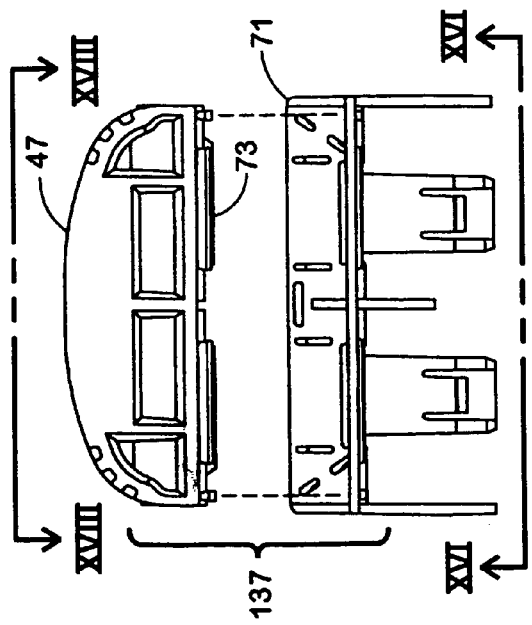

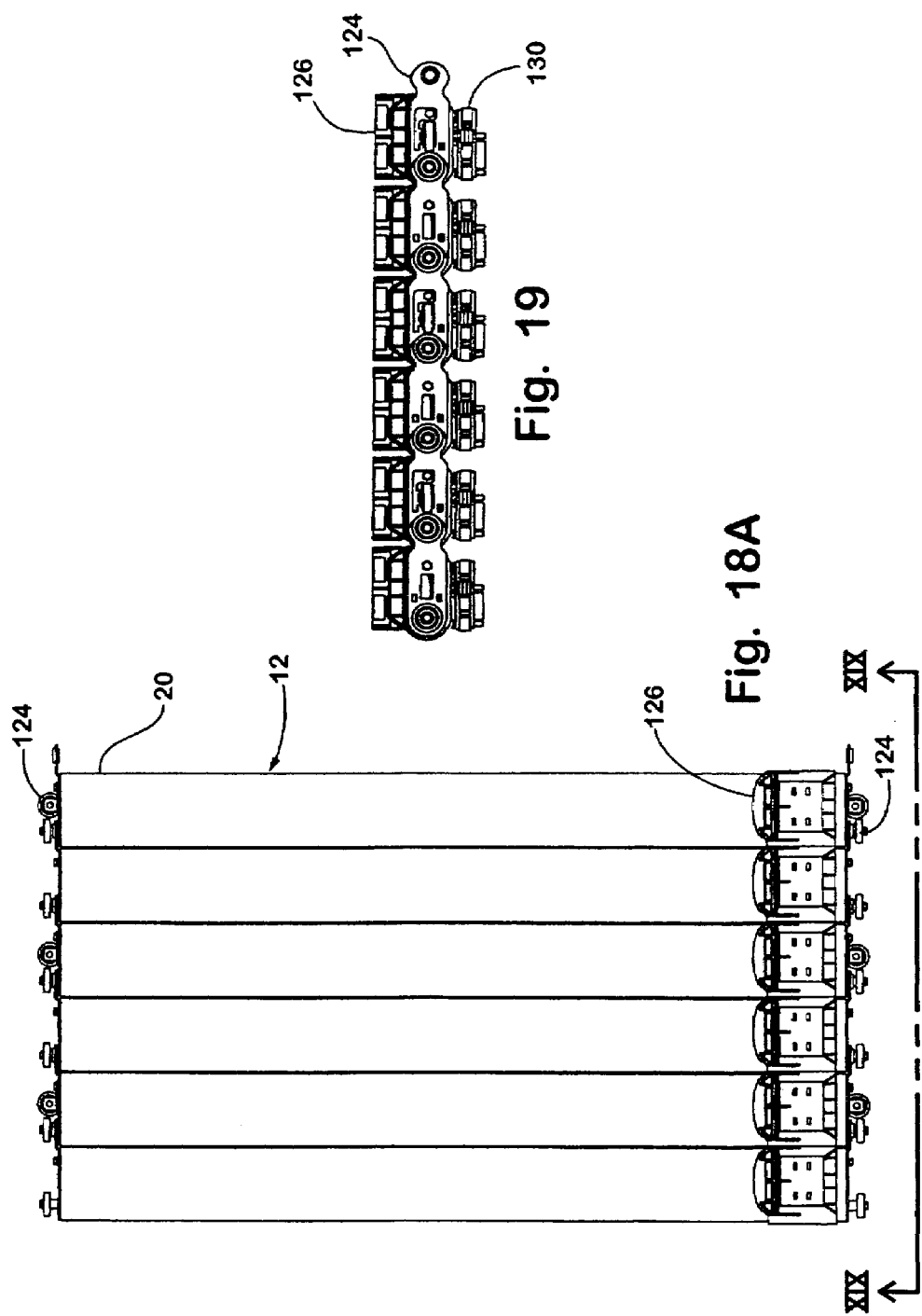

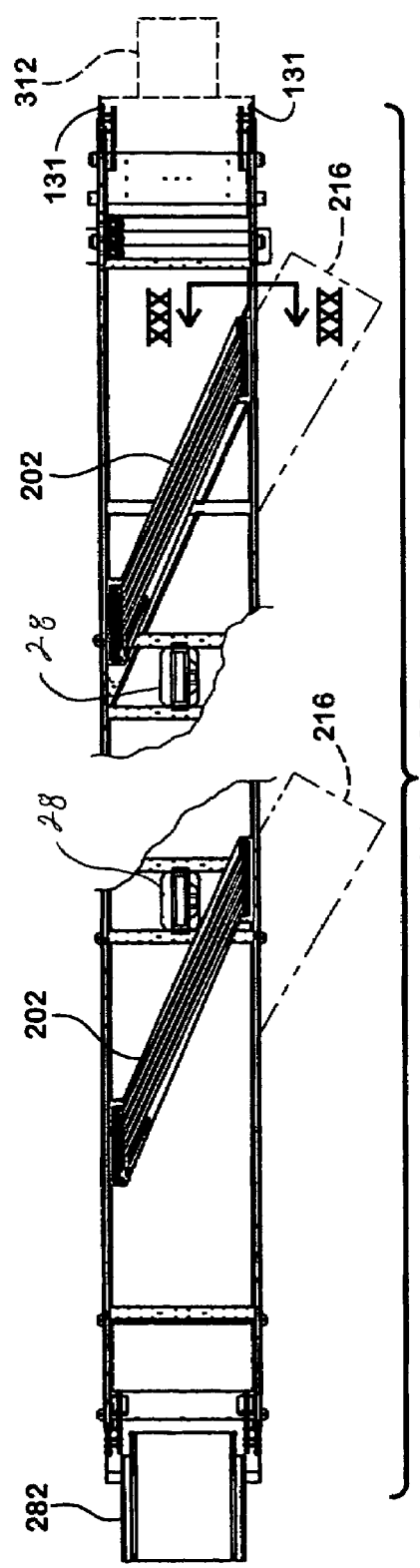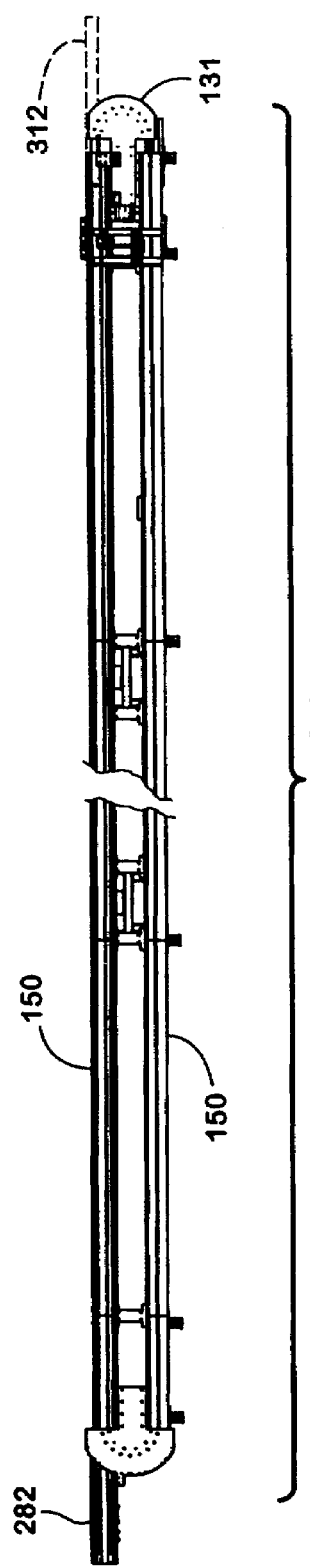

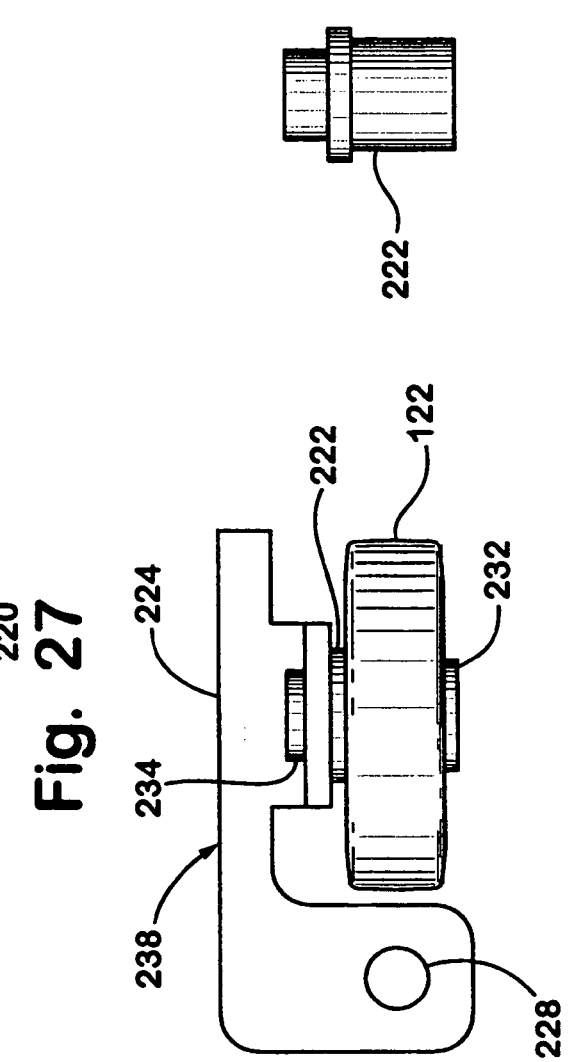
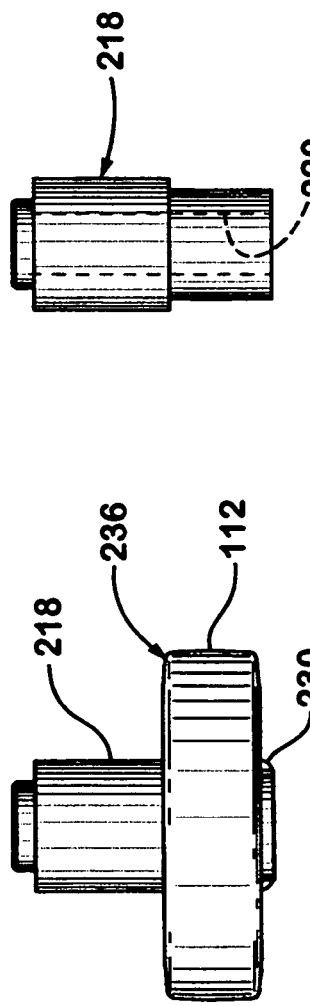
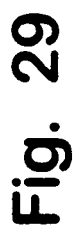
Fig. 26
Fig. 27
Fig. 28
Fig. 29

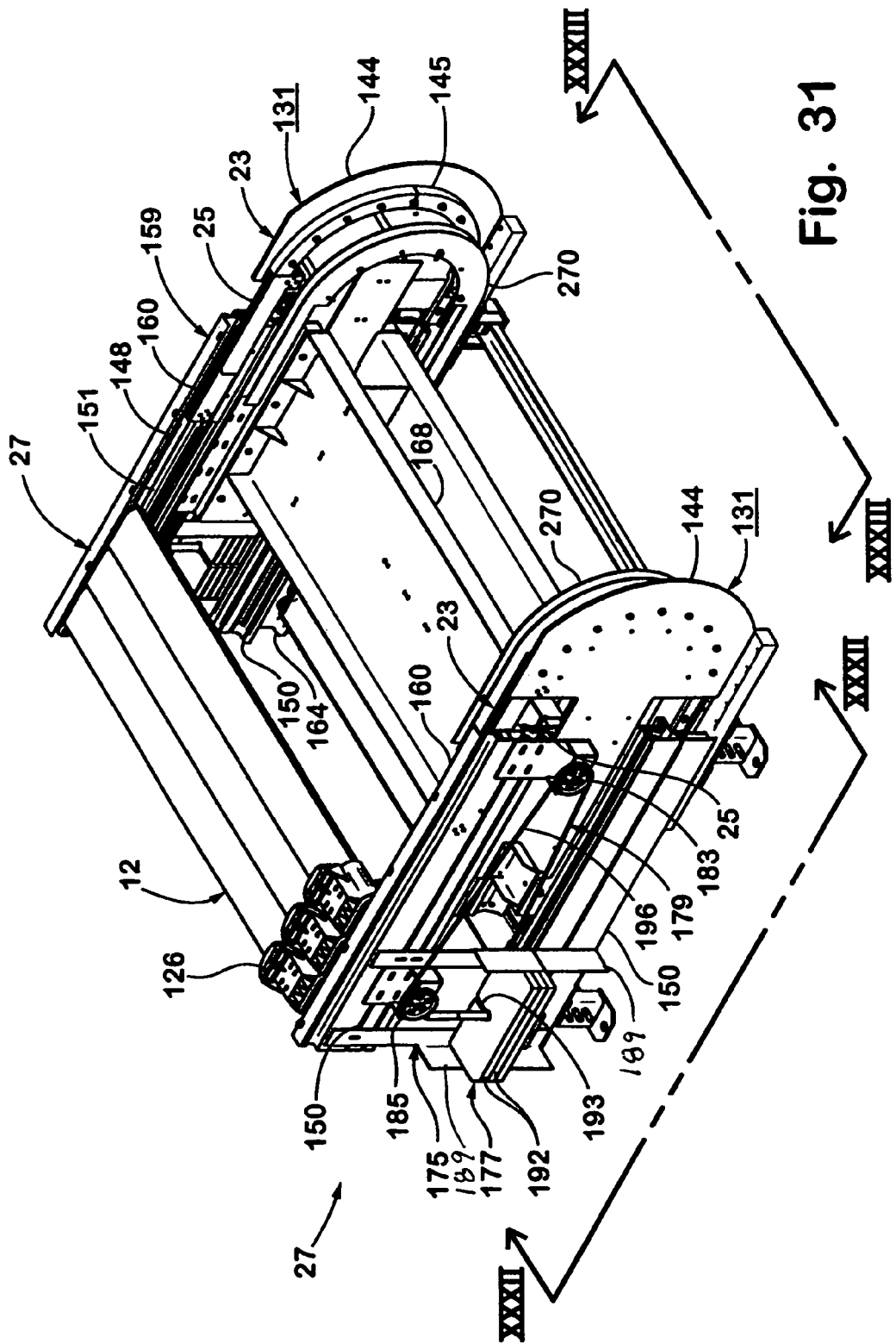

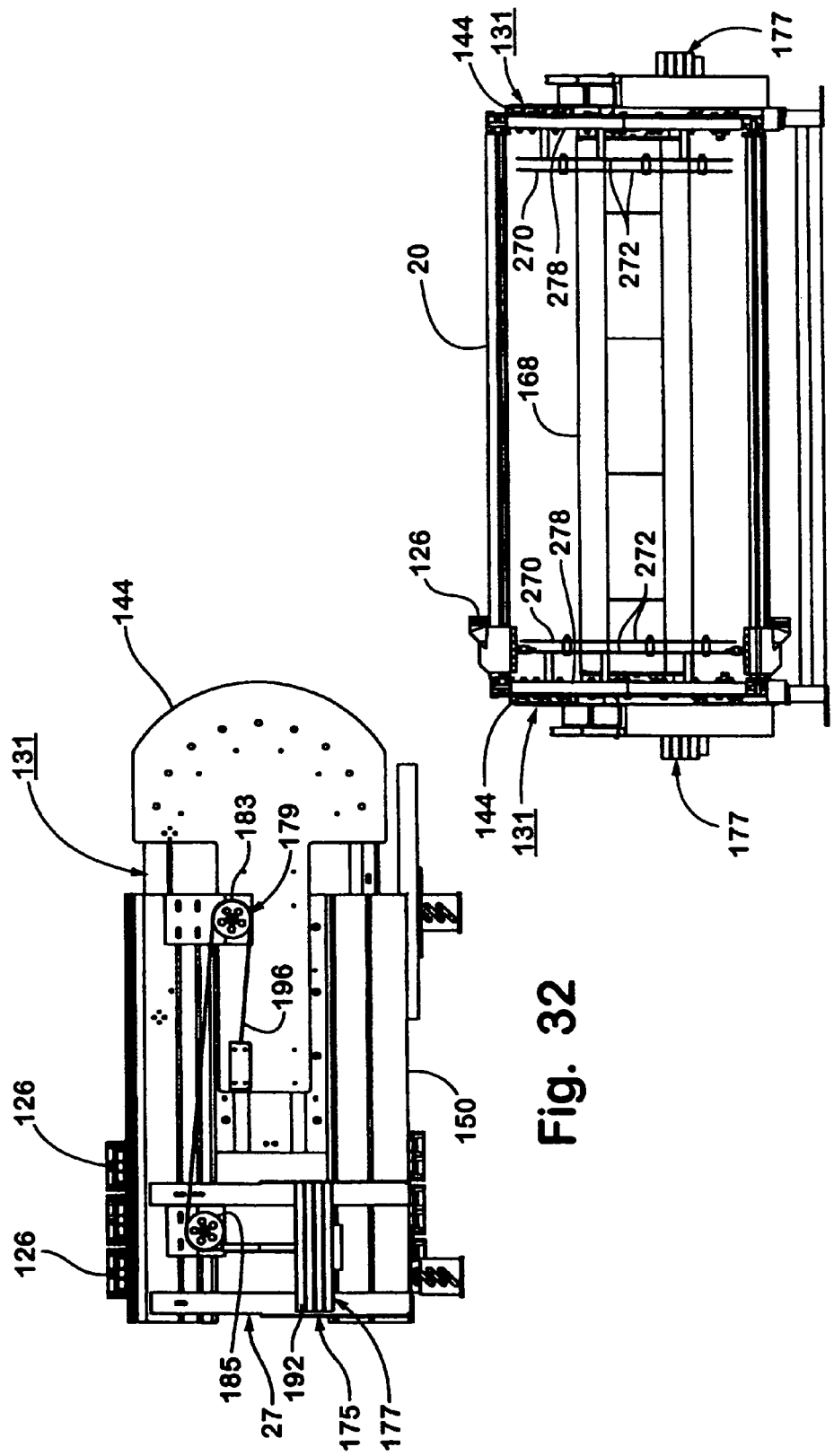

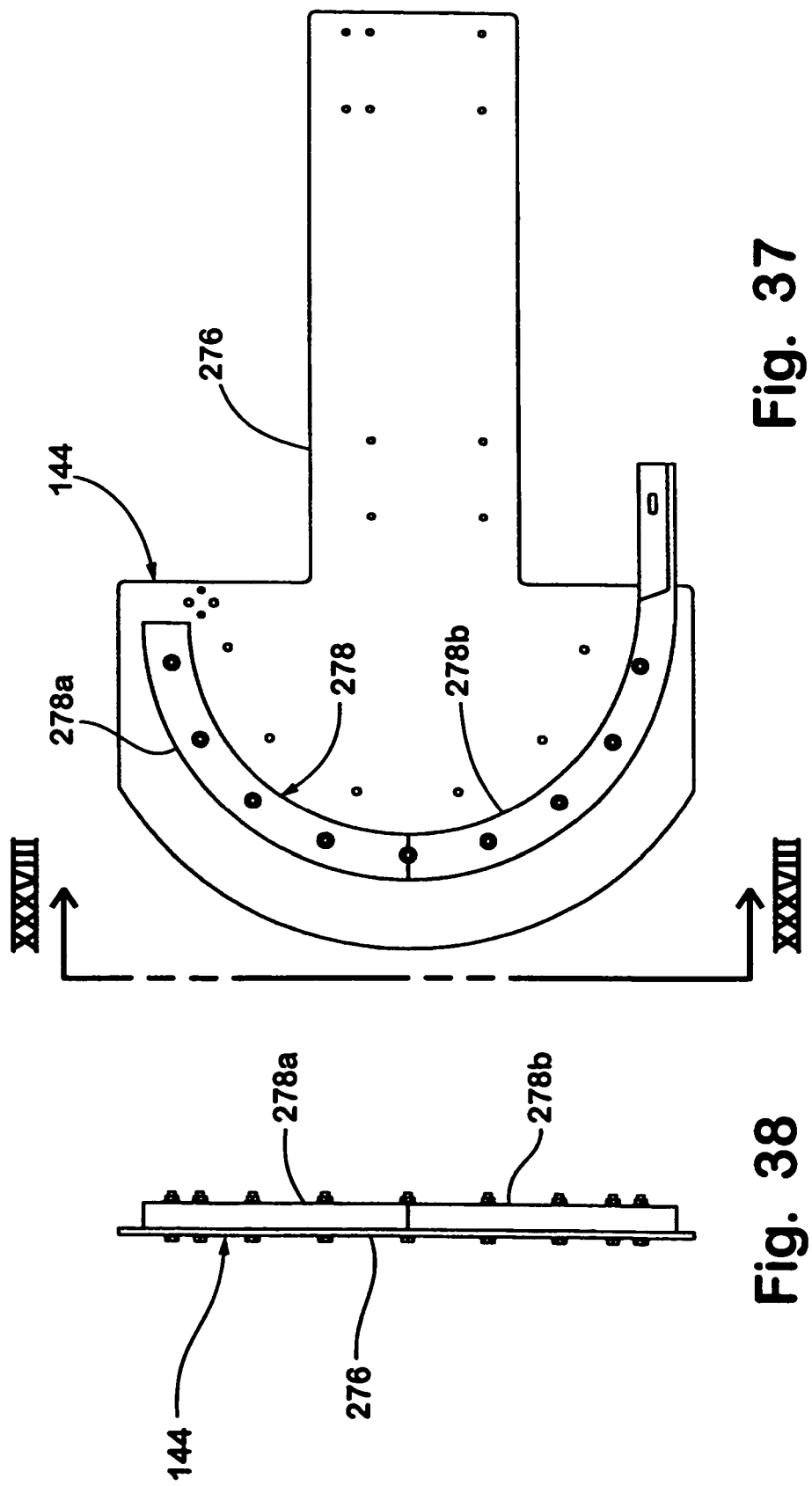

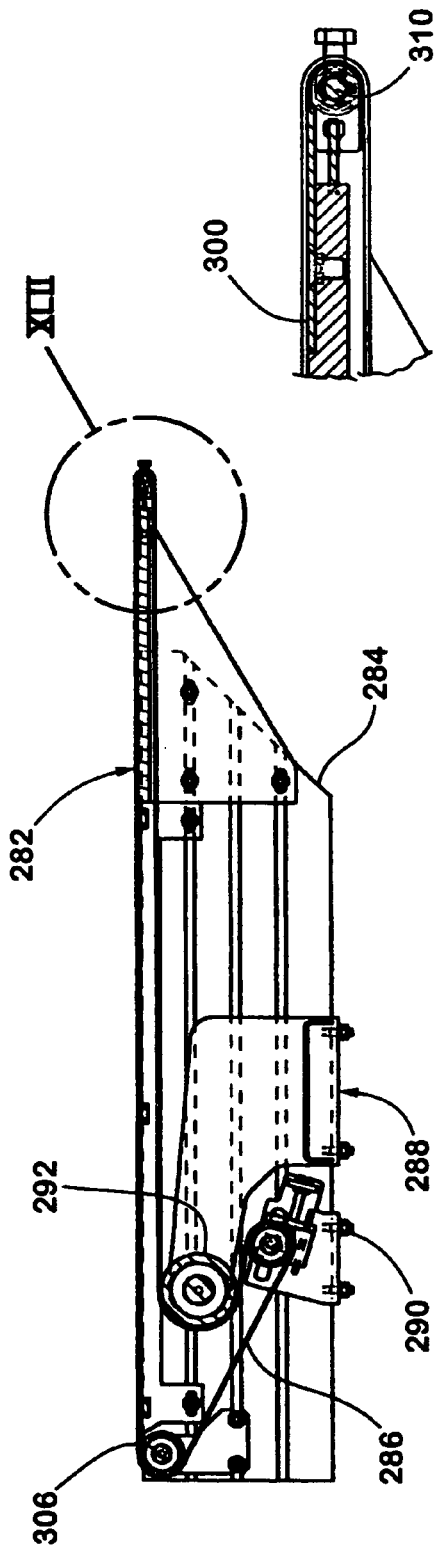
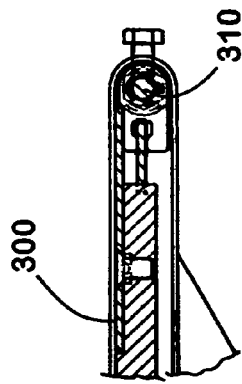
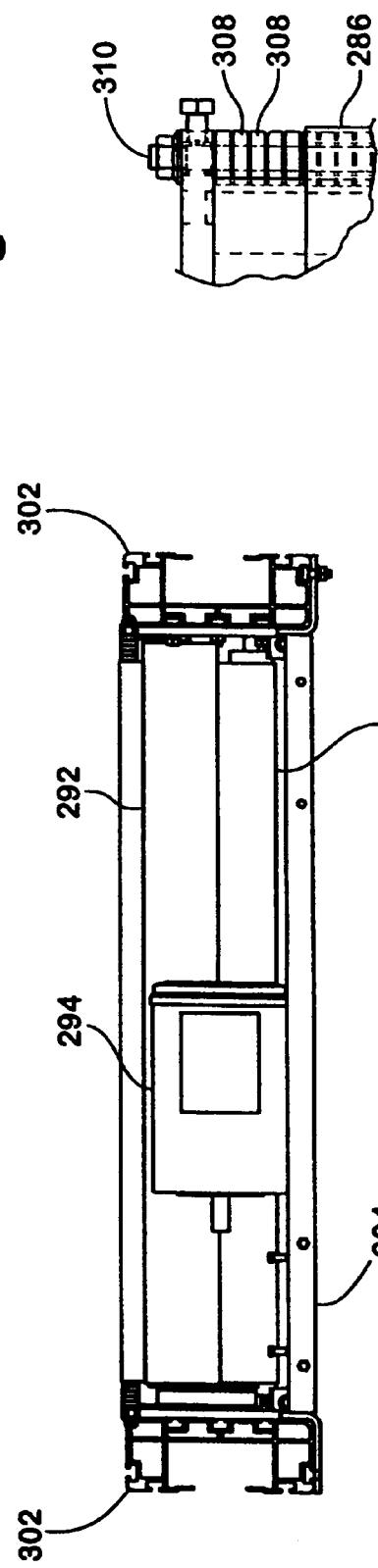
Fig. 41
Fig. 42
Fig. 43
Fig. 44

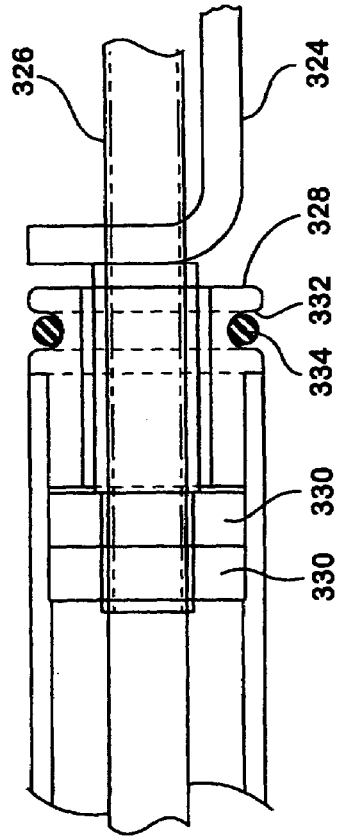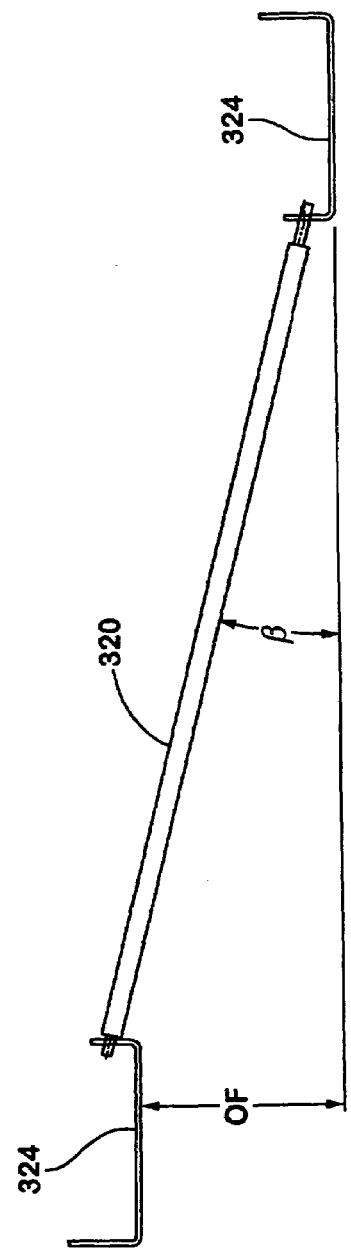

POSITIVE DISPLACEMENT SORTER

CROSS-REFERENCE TO RELATED APPLICATIONS

This application is a division of U.S. patent application Ser. No. 10/248,981, filed on Mar. 6, 2003 now U.S. Pat. No. 6,860,383, which claims priority from U.S. provisional patent application Ser. No. 60/362,415, filed on Mar. 7, 2002; U.S. provisional patent application Ser. No. 60/368,881, filed on Mar. 29, 2002; and U.S. provisional patent application Ser. No. 60/446,048, filed on Feb. 7, 2003, the disclosures of which are hereby incorporated herein by reference in their entirety.

BACKGROUND OF THE INVENTION

This invention relates generally to conveyor sortation systems and, in particular, to a positive displacement sorter of the pusher shoe and slat configuration.

Positive displacement sortation conveyors are known having a main conveying surface and diverter shoes that are generally used to displace articles laterally on the main conveying surface, such as when the articles are to be diverted upon one or more spur conveyor lines typically placed at an angle to the main conveying surface. Such conveyors may include a pair of endless chains and a plurality of members, such as slats, connected at their opposite ends to the chains in order to provide a moving conveyor surface. Each slat, or a pair of slats, is fitted with a pusher or diverter shoe mounted in a manner such that the shoe moves laterally across the slat(s). Movement of the shoe is guided by a guide track beneath the conveying surface. At the loading end of the sortation system, the shoes have a particular orientation with respect to the conveying surface. When an article is to be diverted to a particular spur line, a diverter assembly is actuated to switch shoes adjacent the article onto one or more diagonal tracks causing the effected shoes to glide across the slats to divert the article. Examples of such positive displacement sorters include commonly assigned U.S. Pat. Nos. 4,738,347 and 5,127,510. Other examples include U.S. Pat. Nos. 3,361,247; 5,409,095; and 4,884,677; and European Published Patent Application Nos. EP 0 602 694 B1 and EP 0444 734 A1.

In many instances, sortation conveyors are driven by rotary motors operatively connected to sprockets, which propel the chains. As the application in which the sortation conveyors are used becomes increasing large, the size of the rotary motors must correspondingly increase in order to provide sufficient power to propel the longer conveying surface, as well as achieve the desired throughput. As the size of the motors and sprockets increases in order to meet the additional power requirements, the noise issued from the rotary motor, as well as the sizes of the sprockets and chains, correspondingly increase.

There is a long-felt need to increase the throughput of conveyor systems. Sortation conveyors and their associated induction conveyors are often the most challenging portion of the conveyor system to handle increasing demands for article throughput. Increase in throughput can be achieved by increasing the speed of the conveying surface. However, there are difficulties in continuously increasing the speed of the conveying surface. Another way to increase throughput is to decrease the gap between articles while ensuring sufficient gap to allow the articles to be properly diverted to their destination spur.

SUMMARY OF THE INVENTION

A positive displacement sorter apparatus, according to an aspect of the invention, includus a plurality of interconnected slats defining an endless web, an upper run of the web defining a conveying surface conveying articles in a longitudinal direction. A plurality of pusher shoes is provided, each moving along at least one of the plurality of slats to laterally displace articles on a conveying surface. At least one diverting rail extends diagonally under the conveying surface with at least one diverter associated with the at least one diverting rail. the pusher shoes include a base and a member extending from the base below the conveying surface. The at least one diverter includes an actuator for selectively actuating the member toward the at least one diverting rail. The at least one diverting rail has a terminal portion. The terminal portion and the member extending from the base of the pusher shoe are configured to direct the member in the longitudinal direction in a substantially continuous change of direction after the associated pusher shoe is moved laterally of the conveying surface. This reduces audible noise at the end of the divert. The terminal portion may include a surface shaped as a curve that terminates tangentially with a longitudinal channel that runs parallel with the frame member. This directs the member in the longitudinal direction after the associated one of the pusher shoes is moved laterally of the conveying surface.

These and other objects, advantages and features of this invention will become apparent upon review of the following specification in conjunction with the drawings.

BRIEF DESCRIPTION OF THE DRAWINGS

FIG. 6 is a perspective view of a pusher shoe, according to the invention;

FIG. 7 is a view taken from VII—VII in FIG. 6;

FIG. 8 is a view taken from VIII—VIII in FIG. 6;

FIG. 14 is a perspective view of a diverting assembly;

FIG. 15 is an exploded top view of the diverting assembly in FIG. 14 with components thereof separated in order to reveal details thereof;

FIG. 16 is a view taken along the lines XVI—XVI in FIG. 15;

FIG. 17 is a view taken along the lines XVII—XVII in FIG. 14;

FIG. 18 is a view taken along the lines XVIII—XVIII in FIG. 15;

FIG. 18a is a top plan view of a portion of the endless web of the sortation apparatus in claim 1;

FIG. 19 is a side elevation taken in the direction of lines XIX—XIX in FIG. 18a;

FIG. 20 is a top plan view of the sortation assembly in FIG. 1 with the slats removed to reveal internal details thereof;

FIG. 21 is a side elevation of the sortation assembly in FIG. 20;

FIG. 26 is a top plan view of a vertical wheel assembly;

FIG. 27 is a top plan view of a support axle for the wheel assembly in FIG. 26;

FIG. 28 is a side elevation of a horizontal wheel assembly;

FIG. 29 is a side elevation of an axle used in FIG. 28;

FIG. 31 is a perspective view of a take-up end of a frame assembly;

FIG. 32 is a side elevation taken in the direction XXXII—XXXII in FIG. 31;

FIG. 33 is an end elevation taken in the direction XXXIII—XXXIII in FIG. 31;

FIG. 37 is a side elevation of a transitional rail assembly;

FIG. 38 is an end elevation taken in the direction of lines XXXVIII—XXXVIII in FIG. 37;

FIG. 41 is a sectional view taken along the lines XLI—XLI in FIG. 40;

FIG. 42 is an enlarged side elevation of area XLII in FIG. 41;

FIG. 43 is an enlarged plan view of area XLIII in FIG. 40;

FIG. 44 is an end elevation taken in a direction XLIV—XLIV in FIG. 40;

FIG. 49 is an enlarged view of area XLIX in FIG. 48; and

FIG. 50 is the same view as FIG. 48 illustrating adjustability of the take-away conveyor.

DESCRIPTION OF THE PREFERRED EMBODIMENT

Figure 1:
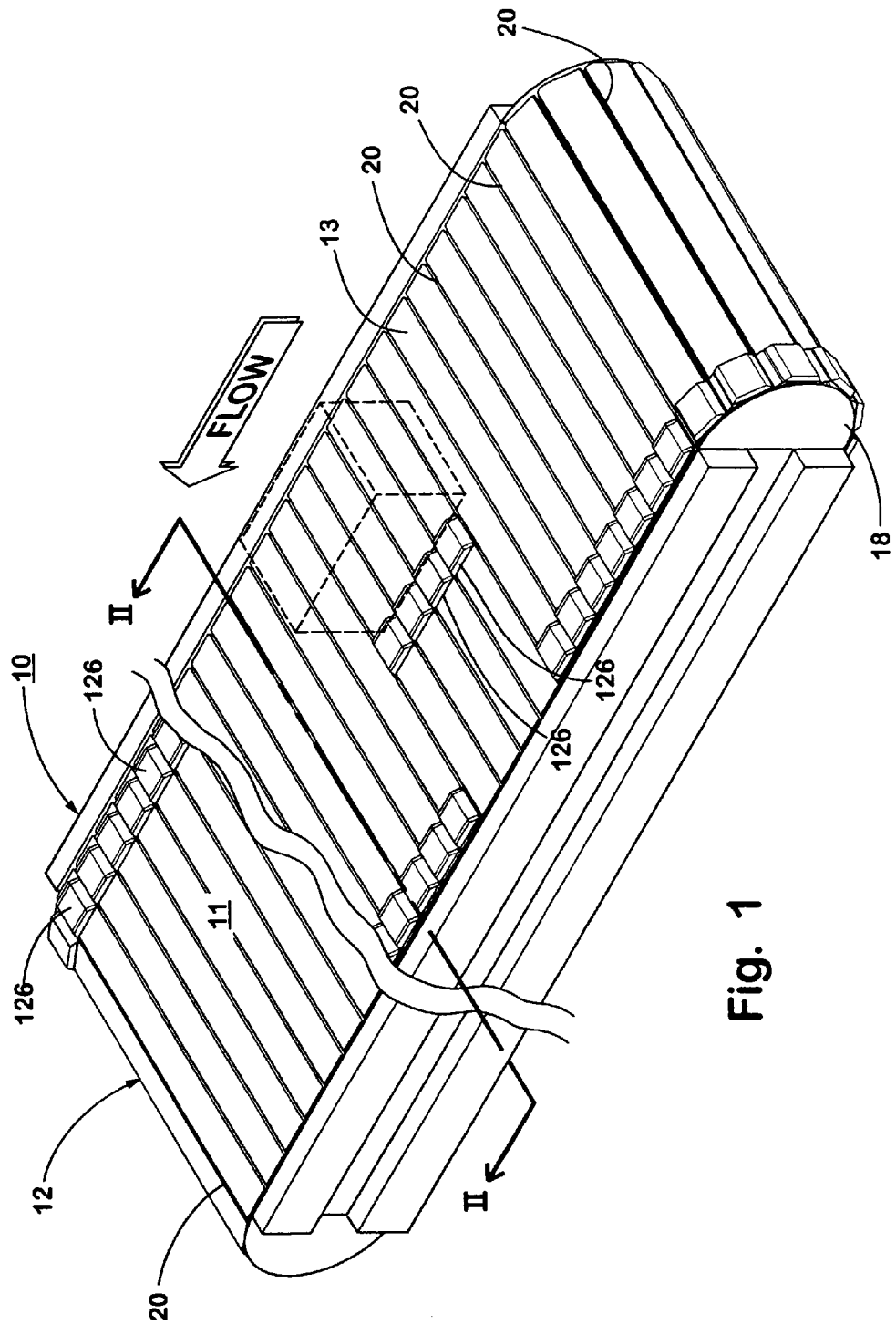
FIG. 1 is a perspective view of a positive displacement shoe and slat sorter assembly, according to the invention.
Figure 2:
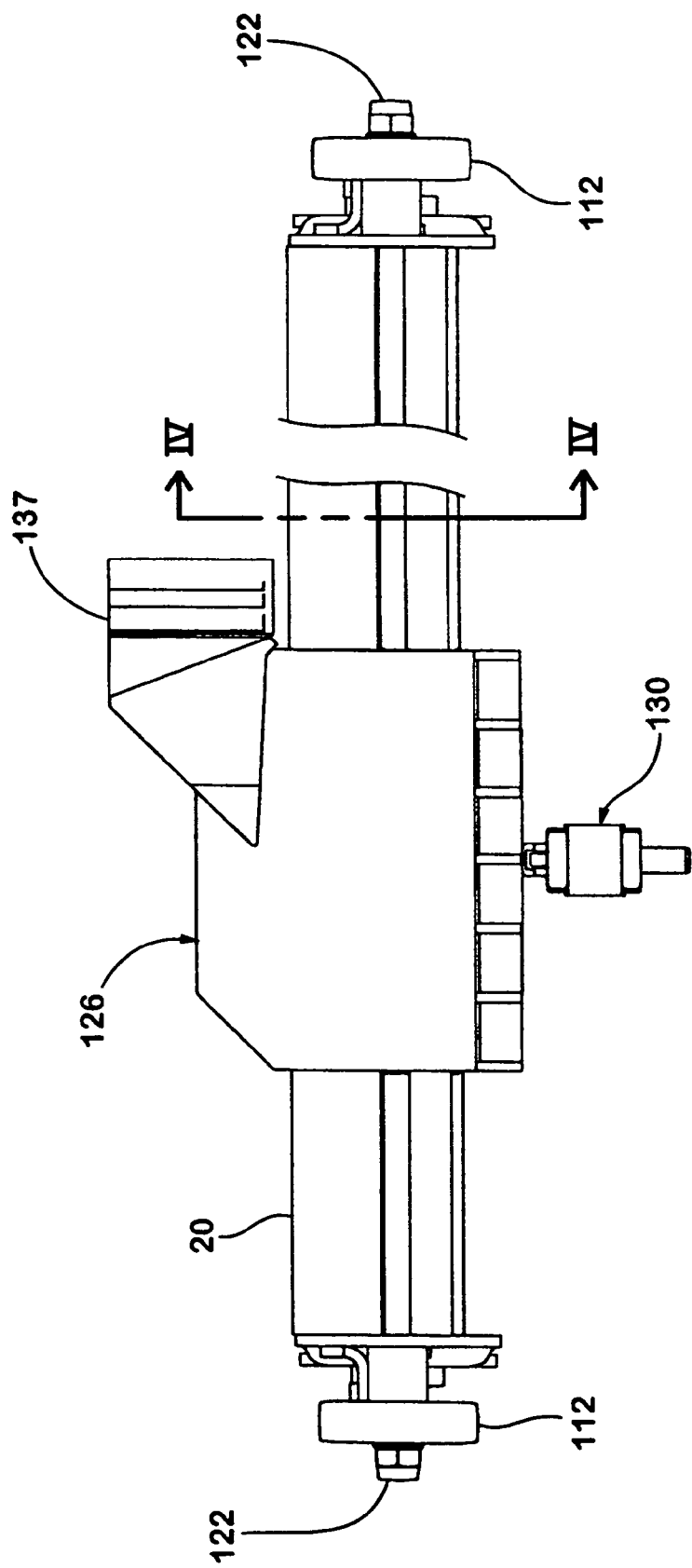
FIG. 2 is an end elevation of a shoe and slat combination taken along the lines II—II in FIG. 1.

Referring now specifically to the drawings, and the illustrative embodiments depicted therein, a sorter assembly apparatus 10 is made up of a plurality of slats 20, which are interconnected in an endless web 12 with pusher shoes, or diverter shoes, 126 traveling along some or all of the slats, either on one slat or between two slats, to laterally displace articles on a conveying surface 11 defined by a top run 13 of endless web 12 (FIG. 1). Diverter rail assemblies 202 laterally displace pusher shoes 126 to divert articles onto selected spurs 216 in order to sort the articles. To do this, diverter rail assemblies 202 include diverter rails 200 extending diagonally across the conveying surface beneath the web and diverter switches having actuators 208 to divert pusher shoes to individual diverter rails.

Sorter assembly 10 may be of the parallel divert type as disclosed in commonly assigned U.S. Pat. No. 5,165,515; of the diagonal divert type as disclosed in commonly assigned U.S. Pat. No. 5,127,510; or a combination of the parallel and diagonal divert type as disclosed in commonly assigned U.S. Pat. Nos. 6,041,909 and 5,927,465, which are all hereby incorporated herein by reference. To the extent not disclosed herein, sorter assembly 10 may be provided according to the principles set forth in commonly assigned U.S. patent application Ser. No. 09/968,742, filed Sep. 28, 2001, by Veit et al. for a POSITIVE DISPLACEMENT SHOE AND SLAT SORTER APPARATUS AND METHOD, and Ser. No. 09/840,639, filed Apr. 23, 2001, by Veit et al. for a SORTATION SYSTEM DIVERTER SWITCH, and published International Application Nos. WO 01/83342 A1, published Nov. 8, 2001, and WO 02/26602 A2, published Apr. 4, 2002, the disclosures of which are hereby incorporated herein by reference.

The terms "front" and "rear" are relative terms to assist in understanding the disclosed embodiment and should not be considered limiting. References to "upper" and "lower," and the like, with respect to a slat or a pusher shoe are relative to the slat or the shoe in the upper run of the web. The terms "longitudinal" or "longitudinally" refer to direction of movement of the endless web. The terms "lateral" or "laterally" refer to direction from side-to-side of the conveying surface, or perpendicular to direction of movement.

Slats 20 are maintained in their respective position in endless web 12 by a wheel assembly 124. Wheel assembly 124 includes at least one wheel sub-assembly 236 having a wheel 112, which is rotatably mounted about a generally horizontal axis that is at the elevation of, and may pass laterally to, the interior 42 of slat 20. Wheels 112 provide vertical support to web 12. Wheel assembly 124 additionally includes a plate 188 between adjacent slats 20. Plates 188 are affixed with a fastener 89 engaging circular channel 54 in slat 20 and the shaft-supporting wheel 112. In addition, plates 188 join a portion of the adjacent slat such as by a fastener passing through a through-opening 220 of a shaft 218 that rotatably supports wheel 112, thereby joining the adjacent slat and providing pivotal movement between the slats. Slats 20 are coupled to wheel assembly 124 at each end of the slat.

Wheel assembly 124 further includes a wheel subassembly 238 having wheels 122 that provide lateral guidance to web 12. Wheel sub-assembly 238 is fastened to the corresponding slat by fastener 89 passing through an opening 228 in a bracket 224 and engaging circular channel 54. Bracket 224 supports a shaft 222 that rotatably supports wheel 122.

Wheel 112 may be retained on shaft 218, and wheel 122 may be retained on shaft 222 by a deforming of a portion of the respective shaft after the wheel is placed over the respective shaft. The deforming of the shaft may be accomplished by a riveting process such as an orbital riveting process which is a known process. In the case of shaft 218, an outer portion of the shaft surrounding opening 220 is deformed outwardly in order form an enlarged portion 230 to retain the wheel. In the case of shaft 222, the entire outer portion of the shaft is deformed to produce an enlarged portion 232 in order to retain wheel 122. The advantage of this process over known use of C-clips, and the like, is that errors which could occur in assembling the wheel assembly are significantly reduced. If a wheel must be replaced, then the wheel sub-assembly 236, 238 including the wheel and shaft may be replaced. Advantageously, shaft 222 may be attached to bracket 224 by a similar deforming process in order to form an enlarged portion 234. Therefore, the wheel 122 may be attached to shaft 222 and shaft 222 to bracket 224 in a single series of similar operations with limited manual assembly, if at all. The result is a wheel subassembly 236 and a wheel subassembly 238 which may be supplied to the assembly operation, or a repair facility, and may be readily attached as part of the endless web and may be stocked as a replacement part.

Figure 4:
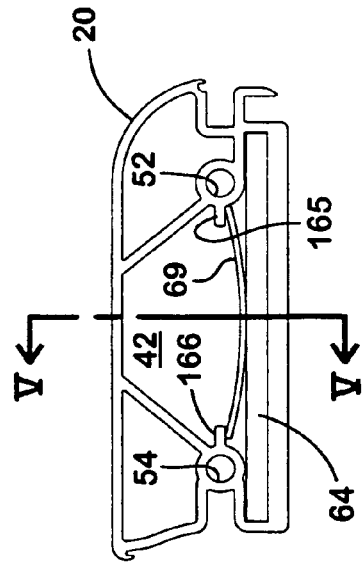
FIG. 4 is a sectional view taken along the lines IV—IV in FIG. 2.
Figure 3:
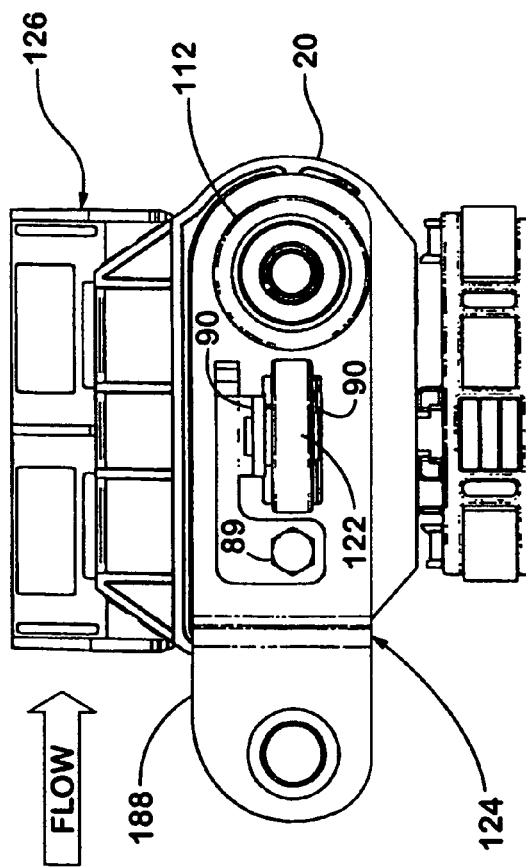
FIG. 3 is a side elevation of the shoe and slat in FIG. 2.
Figure 5:
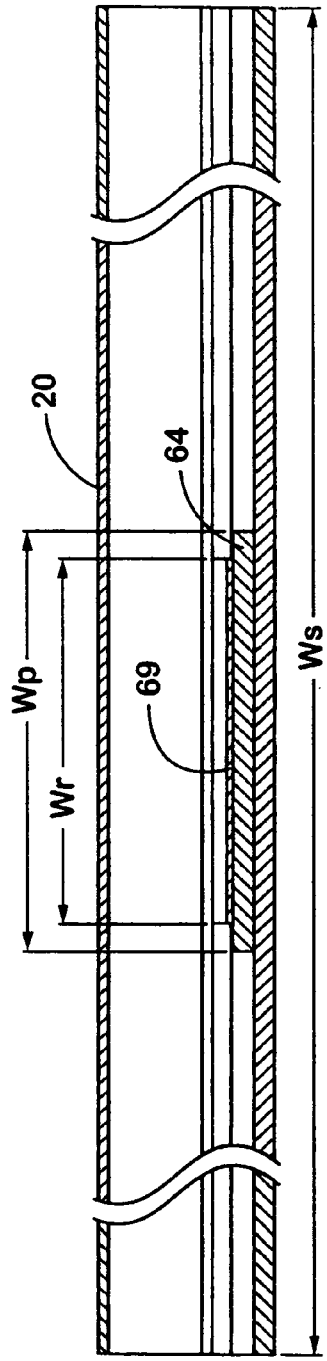
FIG. 5 is a sectional view taken along the lines V—V in FIG. 4.
Figure 9:
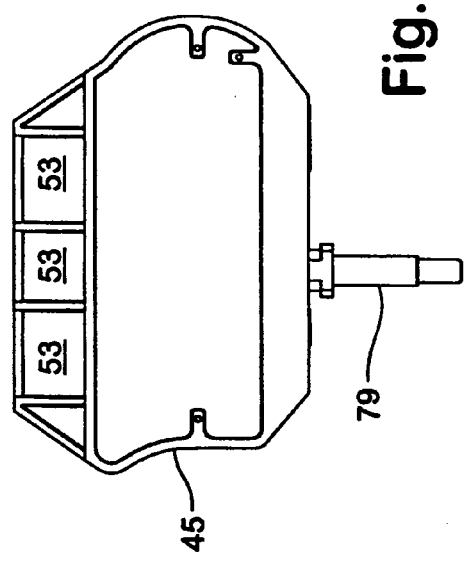
FIG. 9 is a bottom plan view of the pusher shoe in FIG. 6.
Figure 10:
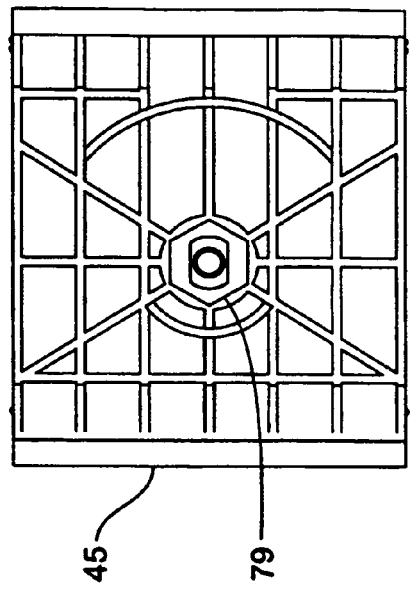
FIG. 10 is a side elevation of the pusher shoe base in FIG. 6 with the transfer assembly removed.
Figure 11:
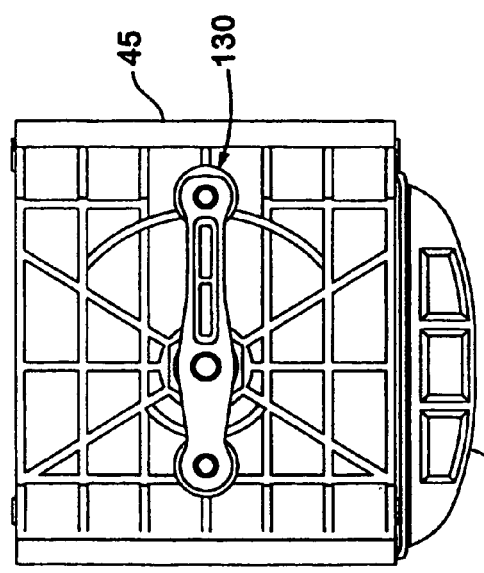
FIG. 11 is a bottom plan view of the pusher shoe base in FIG. 10.
Figure 13:
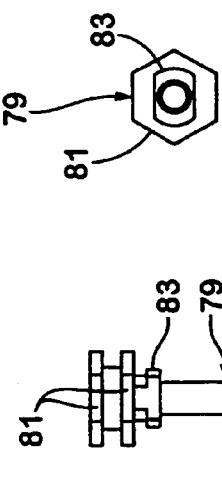
FIG. 13 is a view taken from the lines XIII—XIII in FIG. 12.
Figure 12:
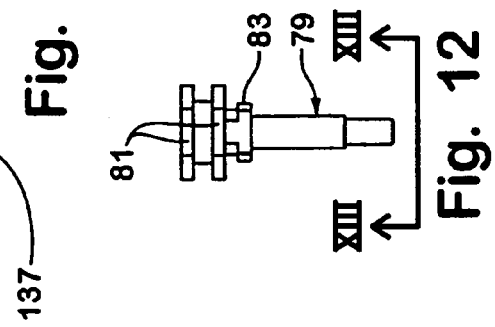
FIG. 12 is a side view of a rotary coupling shaft.
Figure 22:
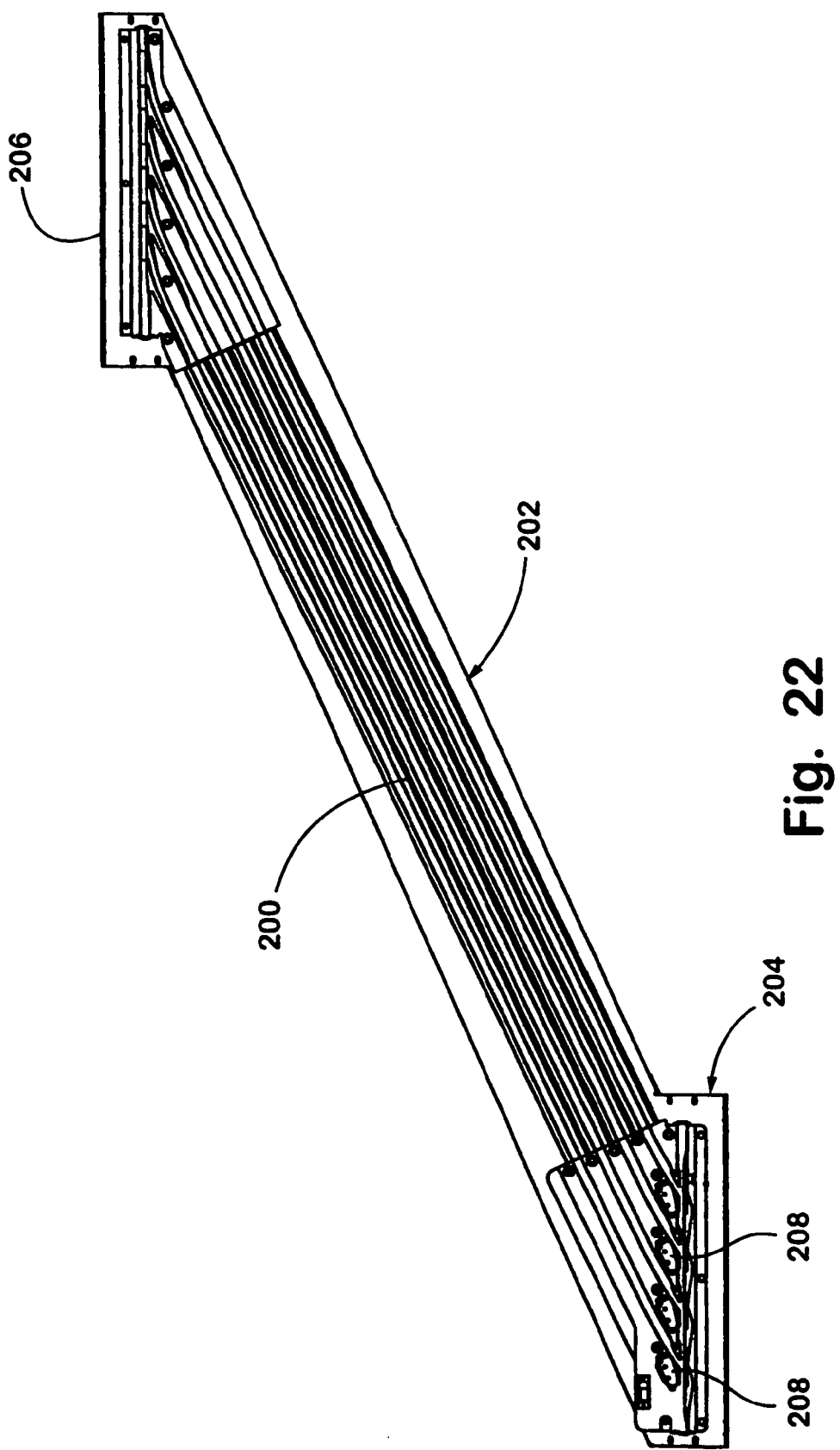
FIG. 22 is a top plan view of a diverting rail assembly.
Figure 23:
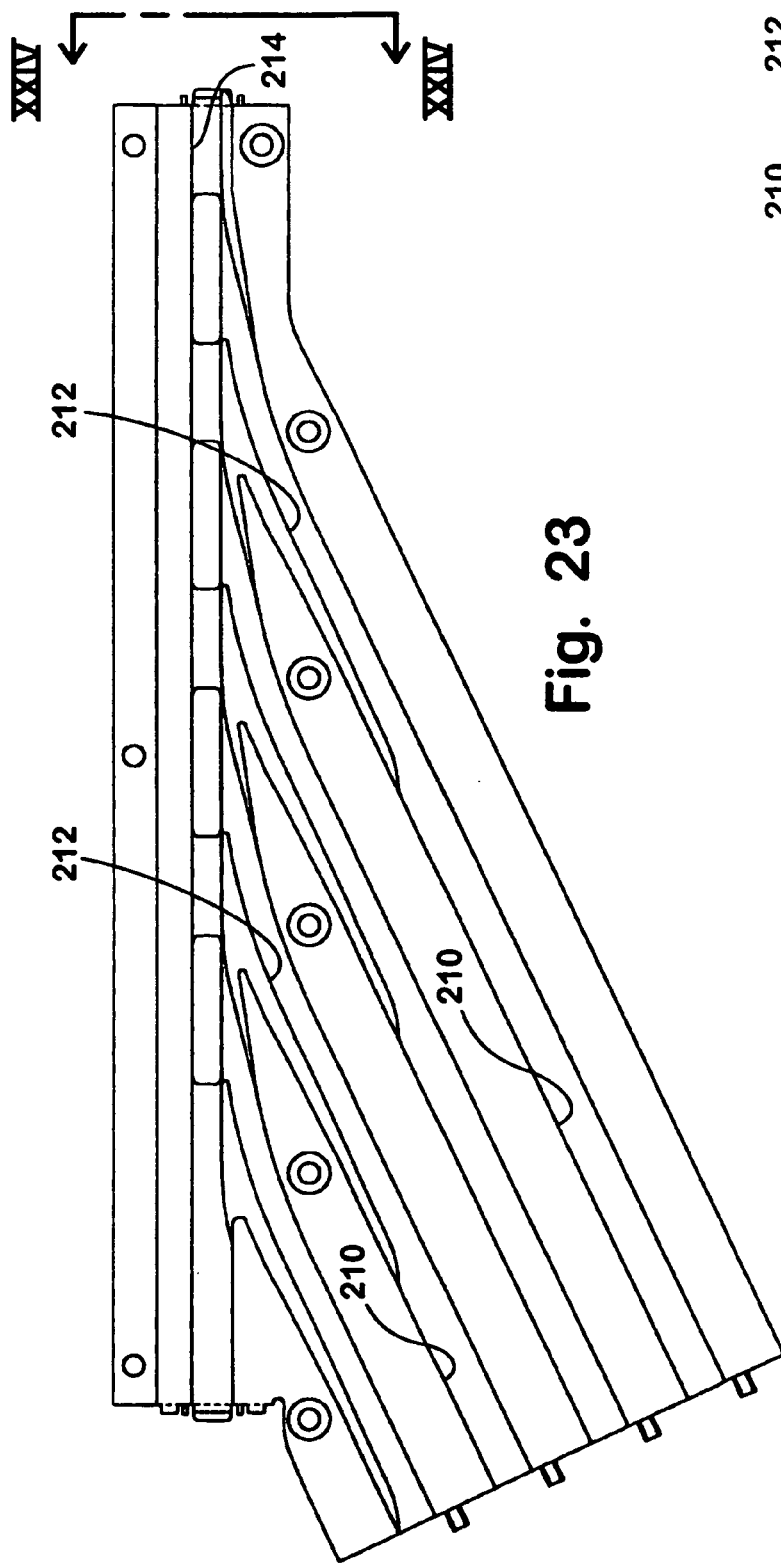
FIG. 23 is a top plan view of a terminal assembly of the diverter rail assembly in FIG. 22.
Figure 24:
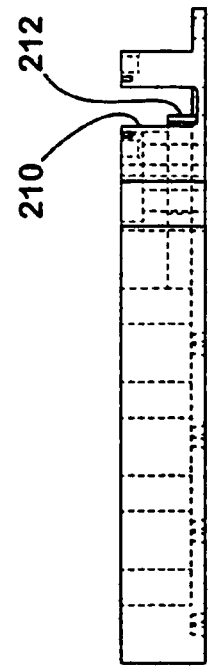
FIG. 24 is an end elevation taken in the direction of lines XXIV—XXIV in FIG. 23.

The propulsion system is defined by one or more linear motor primaries 28 and linear motor secondaries. The secondaries include magnet plates 64 retained within the interior of at least some of the slats 20. The propulsion system is used to propel endless web 12. A magnet plate 64 may be included within each slat 20 or fewer than all of the slats. Magnet plates 64 may be retained within the associated slat 20 by a retainer 69 (FIGS. 4 and 5). Retainer 69 is an elastic spring member which biases the associated magnet plate against a wall of the slat. The retainer acts against flanges 165, 166 defined within the interior of the slat 20. In the illustrated embodiment, the retainer is made from aluminum and the magnet plates are made from steel. However, other materials may be used for the retainer, such as plastic, steel, copper, or the like. Retainer 69 is urged into a generally arcuate shape in the slat and is elastic in order to maintain a bias against the magnet plate.

As best seen in FIG. 5, the magnet plates 64 have a width Wp that is less than half of the WS of the corresponding slat 20. It can also be seen in FIG. 5 that the width Wr of retainer 69 is substantially the same as the width of the corresponding magnetic plate 64. This provides for effective retention of the magnet plate within the interior of the corresponding slat 20. It can be further seen from FIG. 4 that the length of the retainer 69 in the longitudinal direction of movement of endless web 12 is greater than half the length of the magnet plate 64. This, again, provides for effective retention of the magnet plate within the corresponding slat 20. The retainer may be provided as an integral member or as a series of separate retainer portions, provided that they provide sufficient retention force to keep magnetic plate 64 positioned.

Pusher shoe 126 may be a wraparound shoe, generally of the type disclosed in commonly assigned U.S. Pat. No. 5,127,510 and co-pending application Ser. No. 09/968,742, filed Sep. 28, 2001, by Veit et al. for a POSITIVE DISPLACEMENT SHOE AND SLAT SORTER APPARATUS AND METHOD, and International Publication No. WO 02/26602 A2, published Apr. 4, 2002, the disclosures of which are hereby incorporated herein by reference. Alternatively, a pusher shoe may be used that is supported by and moves along facing end portions of adjacent slats. Shoe 126 may be molded from a plastic material that is made of a series of wall segments having a substantially uniform thickness as disclosed in the commonly assigned '510 patent. Pusher shoe 126 may be a one-piece shoe. It could also have separate support portions that move along the respective slat and diverter portions and diverter portions, or assemblies, that laterally displace product on the conveying surface, as disclosed in the '510 patent.

Pusher shoe 126 has a base 45 made up of a polymeric material, which is selected for its relatively low cost and high strength. Base 45 includes inward projections 180, 182 and 184, which provide slat engagement portions which engage corresponding portions of the slats. By way of example, inward projection 184 cooperates with its corresponding shoe-engaging portion of the slat to form a lateral stabilizer for resisting rotation about a vertical axis. Inward projections 180, 182 resist rotation about the long axis of the slat as well as support the weight of the shoe. Inward projections 180, 182 and 184 in the illustrative embodiment are covered with a second polymeric material that is self-lubricating. Inward projections 180, 182 and 184 may be covered with strips that fit over inward projections on base 45. Alternatively, inward projections 180, 182 and 184 may be made in their entirety of self-lubricating material and supported by base 45 in another manner that would be apparent to one of ordinary skill in the art, such as by fasteners, or the like.

Pusher shoe 126 additionally includes a diverting assembly 137. Diverting assembly 137 may be integrally formed with base 45 or, as illustrated herein, may be coupled with base 45, such as by snap engagement with the base, or the like. Diverting assembly 137 includes an article-contacting member 47 that is flexible, and may also be resilient, thereby cushioning the impact with articles being diverted. In order to enhance such cushioning function, article-contacting member 47 may include voids 49 which enhance the flexibility of the article-contacting member. Additionally, article-contacting member 47 may have a convex surface that may be of generally arcuate shape.

Sorter 10 is capable of operating at high speeds. By way of example, sorter 10 may be capable of sorting 300 or more industry standard packages per minute. At such speeds, the impact of pusher shoe 126 against an article is softened by the cushioning of article-contacting member 47. The arcuate shape of article-contacting member 47 ensures that there will be more than a single-point contact with the article being diverted.

Diverting assembly 137 includes extensions 51, which fit within openings 53 of base 45. Extensions 51 include resilient tabs 55, which engage openings 57 in base 45 in order to retain the diverting assembly to the base. A tool, such as a screwdriver, may be inserted in openings 57 to release the extensions from the openings 53.

The configuration of base 45 and diverting assembly 137 also allows the diverting assembly to be positioned on either lateral side of base 45. This allows the pusher shoe 126 to be used as either a right-hand divert, a left-hand divert, or, with two diverting assemblies, a bilateral divert. Diverting assembly 137 further includes wings 59 that cooperate with sloping surfaces 61 of base 45 in order to reduce jams between stationary packages. Wings 59 also include sloped surface 63 at an angle α from vertical in order to further help in deflecting jammed packages. Article-contacting member 47 is made from a polymeric material that imparts the flexible and resilient properties thereof and may snap-fit to a support 71, such as by flexible flanges 73 engaging openings 75 in support 71.

Pusher shoe 126 may include a transfer assembly 130 extending downwardly from the pusher shoe. To the extent not disclosed herein, transfer assembly 131 may be of the type disclosed in commonly assigned U.S. patent application Ser. No. 09/840,639, filed Apr. 23, 2001, by Veil et aL for a SORTATION SYSTEM DIVERTER SWITCH, and International Publication No. WO 01/83342 A1, published Nov. 8, 2001, the disclosures of which are hereby incorporated herein by reference. Transfer assembly 130 may be an elongated member utilized to divert the pusher shoe to a guide rail and to guide the pusher shoe along a guide rail of a diverter rail assembly 202 in order to divert packages. The transfer assembly includes a pilot, or guide, or lead low-friction member, such as a roller or bushing 132, an intermediate low-friction member, such as one or more rollers or bushings 140, and a trailing low-function member, such as a roller or bushing 138. Low-friction members 132, 140 and 138 are supported by a toggle 134. Transfer assembly 130 further includes a rotary coupling 136 rotatably supporting toggle 134 to base 45. Rotary coupling 136 includes a pin 79 joined with base 45, such as by insert-molding, or the like. Pin 79 includes a pair of hex flanges 81 to make a strong connection with base 45 and lip 83. Pin 79 is treated by known techniques in order to make it more stress-resistant. Rotary coupling 136 may further be defined by lips 83. Lips 83 extend in opposite directions below flange 81 engaging fingers 85 of toggle 134 in order to retain the toggle to the base 45 while allowing limited rotary motion between the toggle and the base. Other means, not shown, restrain toggle 134 to a relatively limited range of motion in order to prevent fingers 85 from rotating out of engagement with lips 83. The means to limit rotary motion may be engaged after the toggle is assembled to the pin in order to allow assembly of the rotary coupling.

A shaft 143 rotatably supports pilot member 132 and extends downwardly from toggle 134 in a direction opposite base 45. Pin 79 also extends below toggle 134 in a direction opposite base 45. Shaft 143 and pin 79 frame a vane 142. As described in published International Application WO 01/83342 A1 published Nov. 8, 2001, a vane may serve the purpose of spanning portions of the diverter track during diverting in order to ensure that, once a divert is initiated, it is completed. Shaft 143 may be made from a magnetic material, such as steel, and may be attracted with a relatively weak force to a magnet (not shown), such as a permanent magnet, positioned within a diverting rail assembly 202. The purpose of this arrangement is in order to maintain transfer assembly 130 in a non-diverting orientation when it is not intended to be diverted in order to avoid mis-diverts, as disclosed in International Publication No. WO 01/83342 A1. Additionally, shaft 143 and pin 79 impart mechanical strength to the transfer assembly by surrounding vane 142, which may be made from a polymeric material and may be commonly molded with toggle 134. Toggle 134 may include voids 86 in order to reduce weight and material cost.

Shaft 143 and a shaft 150 supporting trailing low-friction member 138 may be retained and positioned by a clasp 152. This provides simplified snap-action mechanical assembly of transfer assembly 130. In the illustrative embodiment, guide bushing 132 is made from a magnetic material in order to be attracted by an electromagnet actuator 208 in order to initiate the divert. Guide bushing 132 may be a unitary or a two-part bushing. An inside bushing may be made out of plastic and rotate on shaft 143. A bearing casing that is made from a magnetically permeable material, such as steel, may be provided external to the inside bushing. Trailing roller 138 may be made from a non-magnetic material, such as plastic, in order to avoid reacting with an actuator of a diverting assembly attempting to divert a trailing pusher shoe. Intermediate low-friction member 140 may be one or, as illustrated, a pair of steel bearings in order to carry the load of the divert of pusher shoe 126 while diverting an article. Intermediate low-friction member 140 would carry the load by interacting with a diverting rail 200.

Diverting rail assembly 202 includes one or more diverting rails 200 which extend between a diverter assembly 204 and a terminal portion 206. Diverter assembly 204 may be as disclosed in U.S. patent application Ser. No. 10/248,235, filed Dec. 30, 2002, by Cochran et al., for a SORTATION SYSTEM MAGNETIC DIVERTER and in International Publication No. WO 01/83342 A1, published Nov. 8, 2001, the disclosures of which are hereby incorporated herein by reference. Because the details of diverter assembly 204 are disclosed in such application and publication, they will not be repeated herein. Suffice it to say, diverter assembly 204 includes one or more actuators 208 which divert a transfer assembly 130 onto a diverting rail 200 where the forward motion of endless web 12 causes the corresponding pusher shoe to travel across the conveying surface. Diverting rail 200 may be generally straight or may be multipie portions at different angles with respect to the longitudinal direction of the sorter assembly, as disclosed in commonly assigned patent application Ser. No. 10/284,591, filed on Oct. 31, 2002, by Veit for a CONVEYOR SYSTEM WITH DIVERTING TRACK NETWORK, the disclosure of which is hereby incorporated herein by reference.

At the end of the divert, a terminal portion 206 of divert rail assembly 202 converts the diagonal motion of the pusher shoe to a longitudinal motion in the direction of the web. Terminal assembly 206 is configured in order to direct the transfer assembly to the longitudinal direction in a continuous motion thereby reducing audible noise produced with conventional diverting rails when the bearing below the pusher shoe strikes the side rail of the sorter. Because the change in direction is generally continuous, terminal portion 206 avoids the abrupt change in direction of the pusher shoe and the collision with the side rail which is characteristic of the prior art.

Terminal portion 206 includes an upper surface 210 which is engaged by rotary coupling 136 as well as pilot member 132 and trailing low friction member 138. Terminal portion 206 additionally includes a lower surface 212 which engages vane 142. Lower surface 212 is curved in a manner which terminates tangentially with a longitudinal channel 214 extending parallel with the side of the frame 18. This configuration allows the vane 142 to guide the transfer of motion from diagonally to longitudinal in a generally smooth continuous motion while providing space for rotary coupling 136, whether being diverted or traveling straight through the terminal portion. This is accomplished while accommodating the tight space constraints of a parallel, or initially parallel, diverter in which multiple diverting rails are utilized for each take-away conveyor 216, and the diverters and diverting rails are spaced apart no more than the spacing, or pitch, of the pusher shoes. Although illustrated for use with a vane 142, it should be understood that lower surface 212 may also be used to guide a pin extending below a bearing and upper surface 210 used to guide a bearing, such as disclosed in commonly assigned U.S. Pat. No. 5,127,510, the disclosure of which is hereby incorporated herein by reference.

Figure 30:
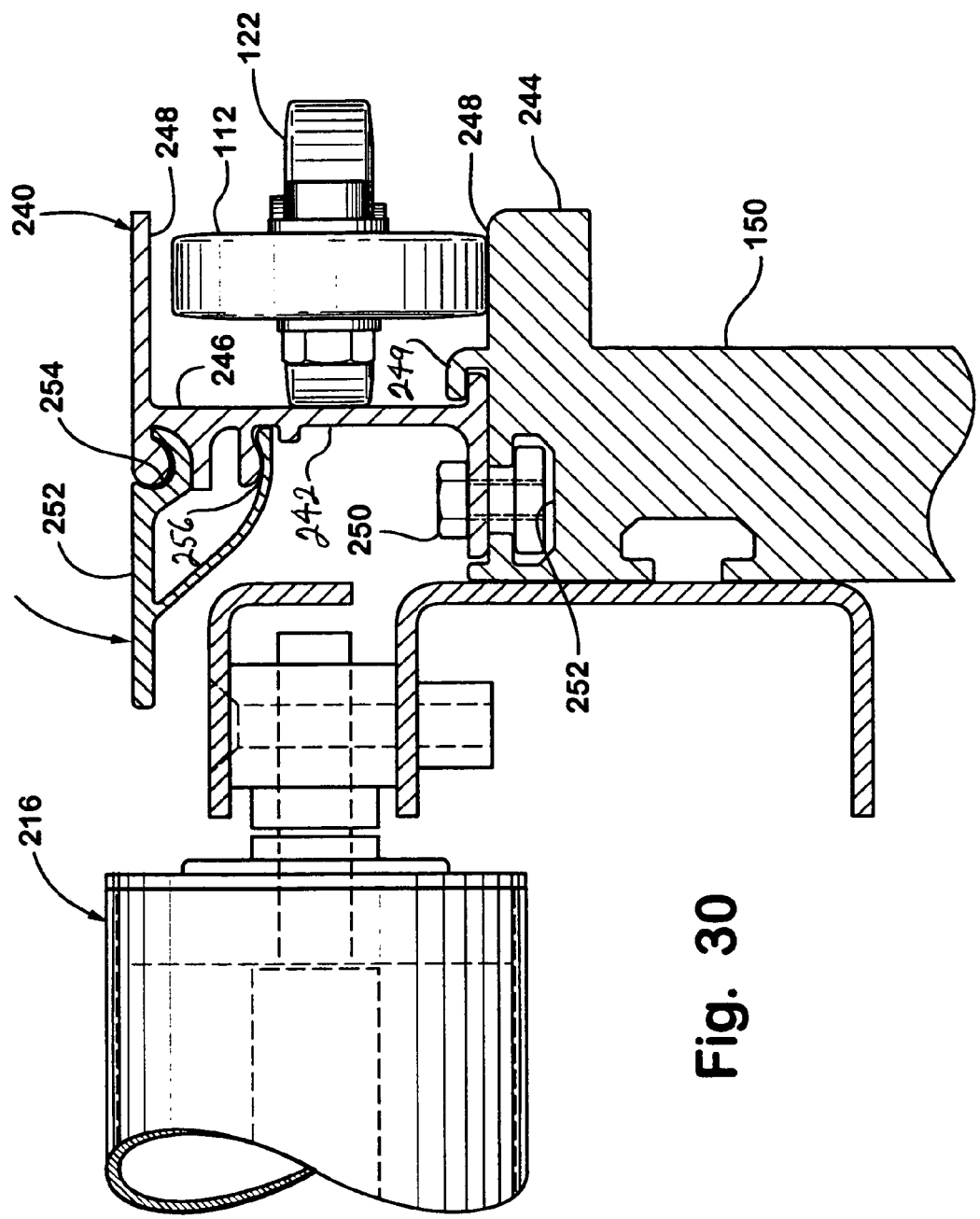
FIG. 30 is a sectional view taken along the lines XXX—XXX in FIG. 20.

Sorter assembly 10 may include an upper portion 240 of the horizontal members 150 of the frame assembly (FIG. 30). Upper portion 240 includes an upper extruded section 242 which is joined with a lower extruded section 244. Extruded sections 242 and 244 define a vertical surface 246 for resisting lateral motion of web 12 and at least one horizontal surface 248 for providing support of the weight of the web. Extruded section 242 may be engaged with lower extruded section 244 by a fastener 250 engaging a T-slot 252 in the lower extruded section 244 and passing through an opening in the upper extruded section 242. A pair of overlapping flanges 249 may support an extruded section in a manner that supports vertical surface 246 against the force exerted by wheels 122. Upper portion 240 may additionally include a cover, such as a dust cover 252, which provides an outward extension, in the direction of take-away conveyor 216, of extruded section 242. The purpose of dust cover 252 is to reduce the gap between the upper extruded section 242 and the take-away conveyor 216. This reduces a tendency of packages to jam while being diverted. Dust cover 252 may be attached to extruded section 242 by a general rotary motion as illustrated in FIG. 30. This is accomplished by a rotary joint 254 defined between the dust cover and the extruded section as well as a snap joint 256 defined between the dust cover and the extruded section. Therefore, by engaging the respective portions of the rotary joint, and rotating dust cover 252 downwardly, the snap joint 256 is engaged. The rotary joint and the snap joint securely retain dust cover 252 in its operative position.

A frame 148 of sortation conveyor 10 includes at least two elongated horizontal members 150, 150 (FIGS. 31–39). Frame 148 includes a first moveable member 23 and force-producing device 27 which define a first adjustable take-up assembly 131 for maintaining tension at one lateral side of endless web 12 and another moveable member 23 and force-producing device 27 which define a second adjustable take-up assembly 131 for maintaining tension at the opposite lateral side of endless web 12. The first and second adjustable take-up assemblies operate substantially independently of each other. This provides a separate take-up function on opposite lateral sides of web 12. This provides a more consistent tension on the web laterally across the web. While, in the illustrative embodiment, there is no interconnection between the take-up assemblies, some interconnection can be accommodated without negating the independent operation of the take-up assemblies.

Each take-up assembly 131 provides a substantially constant force upon one end of web 12 to thereby maintain the same in the proper state of tension, and takes up any slack existing between slats 20. Each take-up assembly 131 may be comprised of two identical sets of components, each of which is attached to a pair of horizontal members 150 at one side of frame 148. Therefore, the subsequent description will detail only one set of components, with the understanding that the identical components may be placed on the opposing side of sortation apparatus.

Take-up assembly 131 includes an end track, or transitional rail assembly, 144 which is supported to extend or retract with respect to horizontal members 150, in the same general manner as disclosed in International Publication No. WO 02/26602 A2, published Apr. 4, 2002.

An expansion joint assembly 25 is provided to enable end track 144 to move in a horizontal direction either towards or away from an upper track 160 and a lower track 164 while maintaining continuity of the track. Joint assembly in the illustrative embodiment is a finger joint having first and second interlaced finger assemblies.

To provide the necessary force upon end tracks 144 of take-up assembly 131, force-producing device 27 in the form of an adjustable force assembly 175 is provided which imparts a constant force upon end tracks 144 to thereby maintain the same in the proper position and thereby take up slack within endless web 12. Adjustable force assembly 175 may include an adjustable weight system 177, and a pulley system 179. Pulley system 179 includes a first pulley 183 and a second pulley 185.

Weight assembly 177 includes a pair of spaced, vertically oriented L-shaped alignment members 189. The weight assembly may be adjustable by adding or subtracting weight. Positioned between alignment members 189 are a plurality of removable weights 192, each of which includes a keyhole-shaped slot 193 for accommodating a cable 196.

A connection member, such as, for example, cable 196, is attached to weight-retaining member 193 and trained about first pulley 183 and second pulley 185. Cable 196 is attached at one end to transitional rail assembly 144 and an opposite end to weight assembly 177.

A frame assembly 148 includes elongated horizontal members 150 which define fastener channels 151 in order to facilitate modular construction of the sorter assembly as disclosed in commonly assigned International Publication No. WO 02/26602 A2, published Apr. 4, 2002, the disclosure of which is hereby incorporated herein by reference. A support track network, generally shown at 159, provides a pathway for wheel assembly 124 to travel in upper and lower runs along frame 148. Support track network 159 includes a track 161 at one side of the sorter apparatus and another track 161 at the opposite side of the sorter apparatus. Each track 161 includes an upper track 160, in order to support the upper run of the web, a lower track 164 in order to support the lower web, and end tracks 144 in order to support transitional sections of the web between the upper and lower runs.

Figure 25:
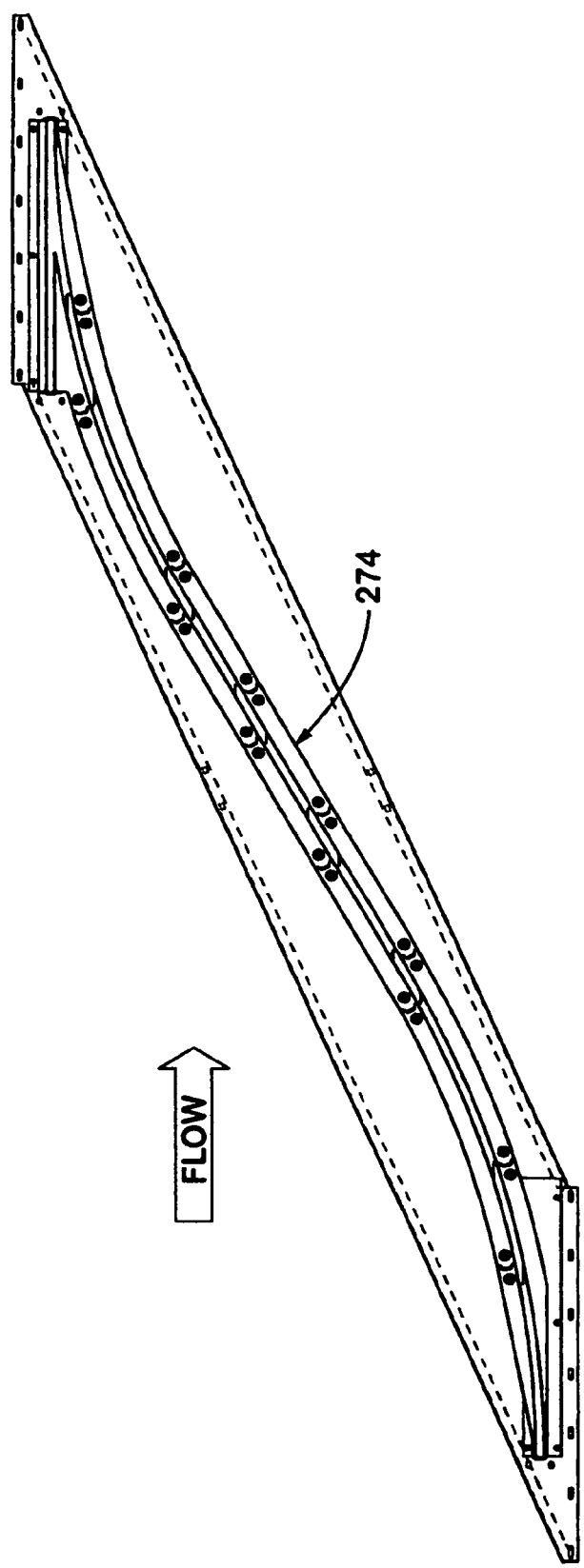
FIG. 25 is a top plan view of a diverter shoe return rail assembly.
Figure 34:
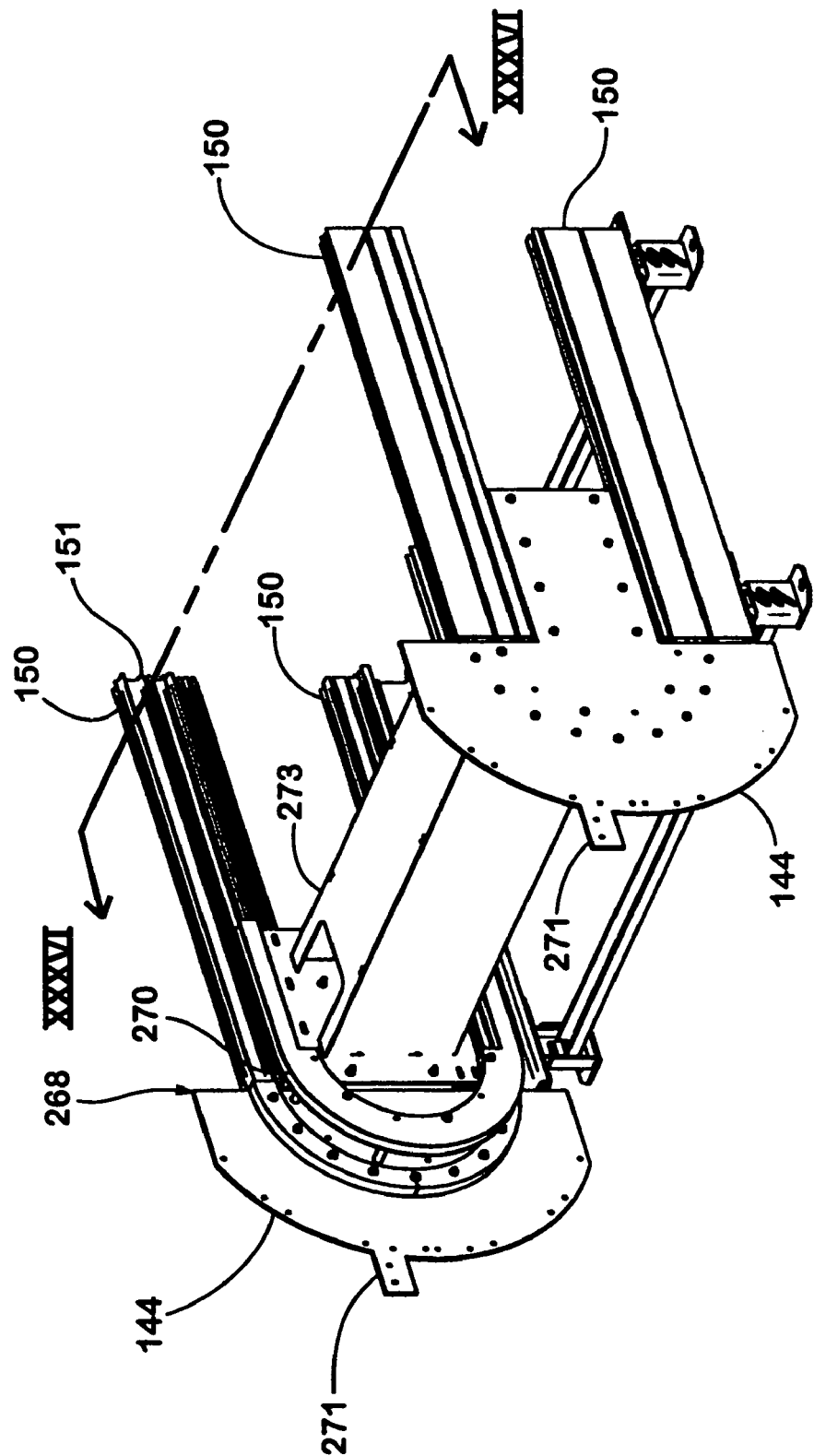
FIG. 34 is a perspective view of a stationary end of a frame assembly.
Figure 36:
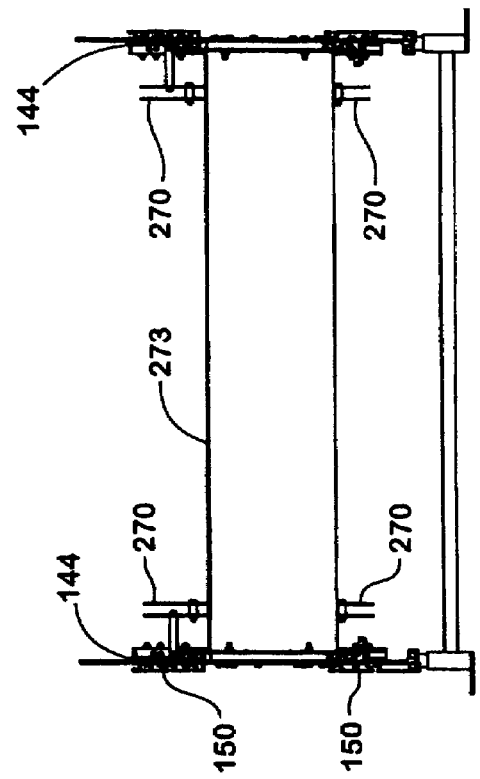
FIG. 36 is a sectional view taken along the lines XXXVI—XXXVI in FIG. 4.
Figure 35:
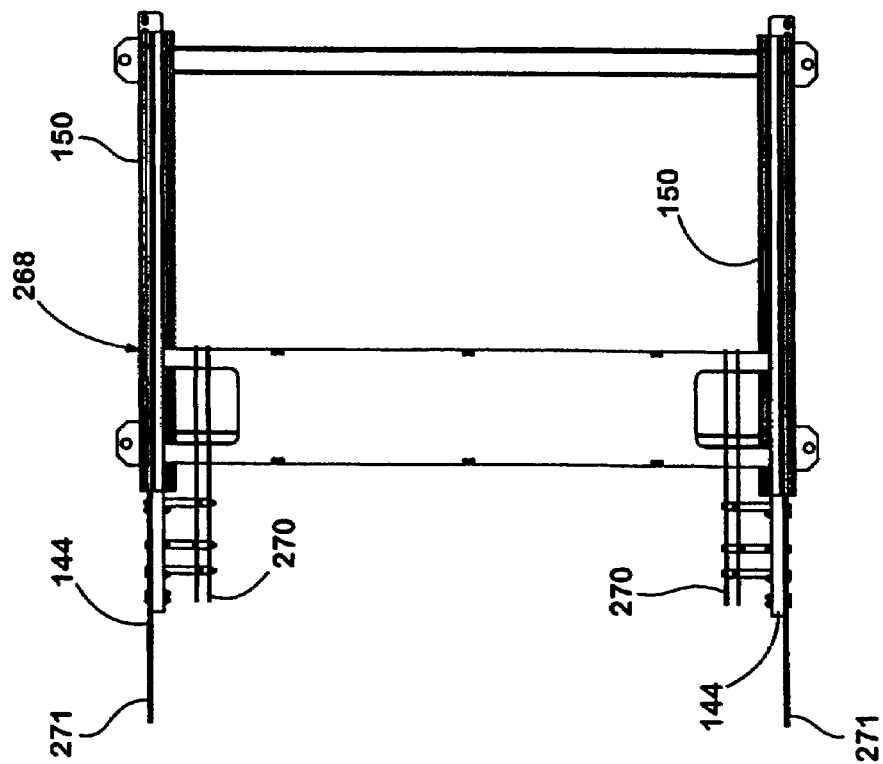
FIG. 35 is a top plan view of the frame assembly portion in FIG. 34.

End track 144 is included as a portion of take-up assembly 131 and is included on a stationary end assembly 268 at an opposite end of the apparatus (FIG. 34). Stationary end assembly 268 may include a cross-support 273 and a pair of mounting flanges 271 which may provide alignment for a feed, or take-away, conveyor, as will be discussed in more detail below. Take-up assembly 131 and end section 268 additionally includes a guide track 270 at an area generally adjacent end track 144. Guide track 270 is made up of a pair of spaced-apart walls 272 which define therebetween a channel for maintaining an in-line orientation of toggle 134 of transfer assembly 130 for each pusher shoe as the pusher shoe goes through the transition between the upper and lower runs of web 12. Alternatively, one wall 272 may be used. In turn, guide track 270 is fed in part by a return rail assembly 274 (FIG. 25) which returns diverted pusher shoes to an undiverted position while traveling in the lower run of the web. Return sweep 274 has a large radius curved shape at both entrance and exits thereof to reduce noise of the return pusher shoes. Shoes that were not diverted continue in their undiverted orientation until the transfer assembly 130 is guided by guide track 270. Although return rail assembly 274 is illustrated for a uni-directional divert in which packages are diverted to take-aways at one side of the sorter assembly, as illustrated in FIG. 20, it should be understood that one or more appropriately modified return rail assemblies would be utilized for a bi-directional divert in which packages are diverted off both sides of the conveying surface.

Figure 39:
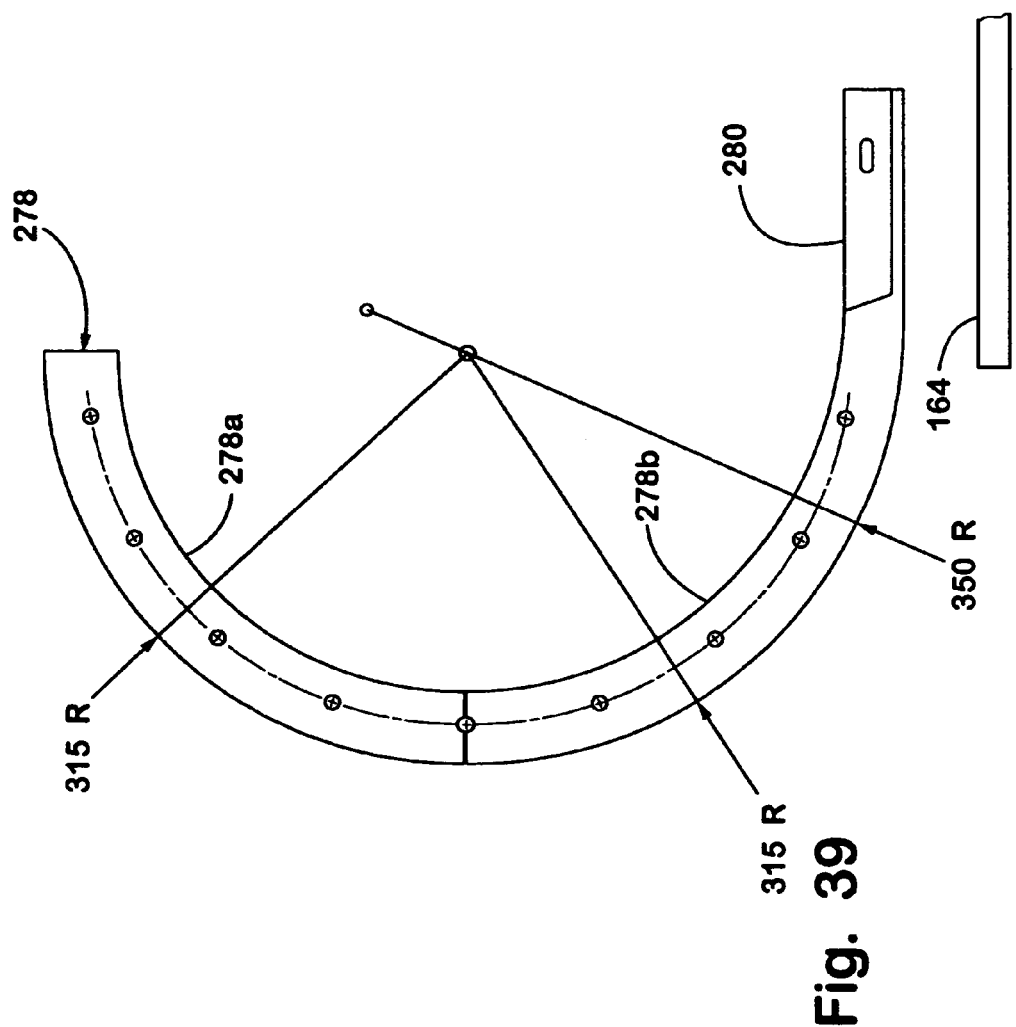
FIG. 39 is the same view as FIG. 37 of the rail portion of the assembly.
Figure 40:
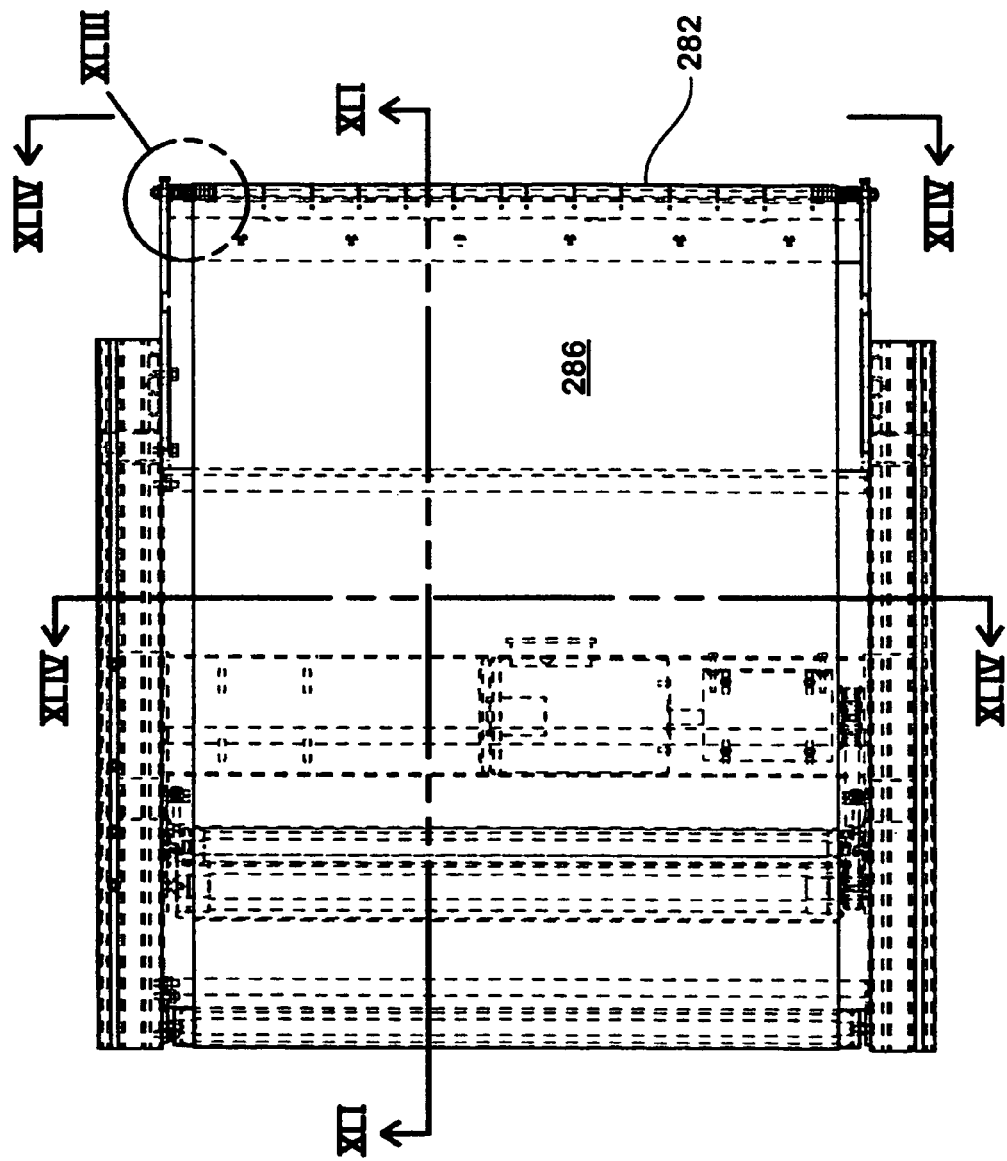
FIG. 40 is a top plan view of a feed conveyor.
Figure 45:
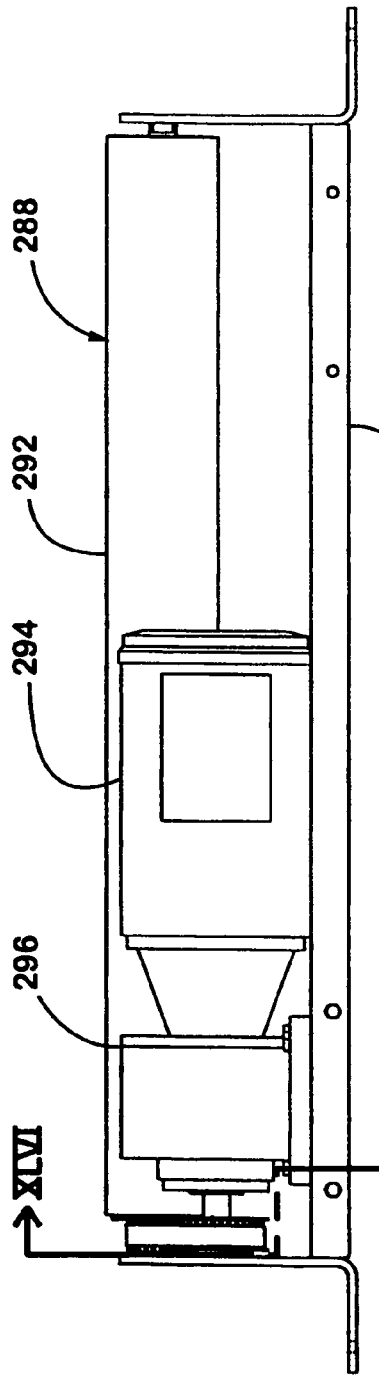
FIG. 45 is an end elevation of a drive assembly.
Figure 46:
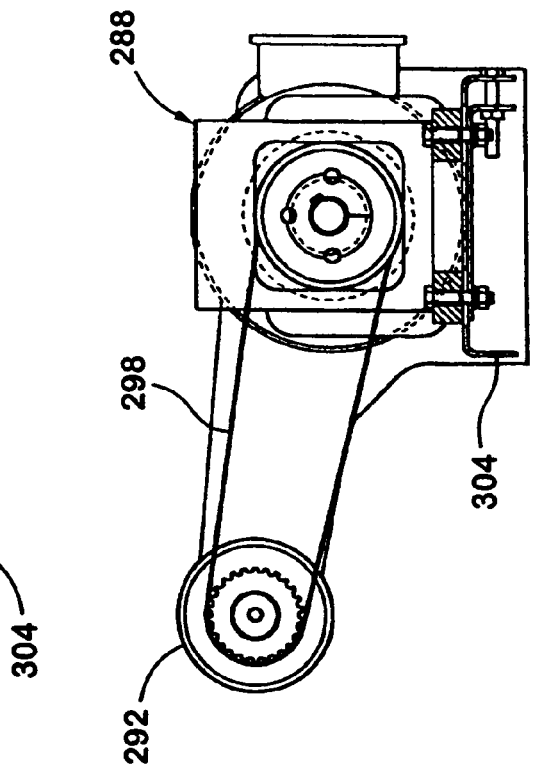
FIG. 46 is a view taken along the lines XLVI—XLVI in FIG. 45.

End track 144 includes a support 276 and a rail 278 (FIGS. 37–39). Rail 278 includes an upper portion 278A and a lower portion 278B. End track 144 may be a part of the take-up assembly 131, and therefore be movable in order to take up slack in the web and maintain consistent tension on the web, or may be stationary at stationary end assembly 268. In one or more of such applications, rail 278 includes an upper portion 278A having a generally constant radii and a lower portion 278B having radii that are different for different locations around the rail. By way of example, in FIG. 39, it can be seen that on rail 278A a generally constant radius of 315 millimeters is utilized. On rail portion 278B the radius increases from 315 millimeters at an upper portion of the rail portion to 350 millimeters at a lower portion of the rail portion. Rail portion 278B may also include an extension 280 that extends beyond the general semi-circular shape of the rail and extends over a portion of lower track 164. It has been found that the use of an increasing radius lower in the rail reduces slap of the slats against the end track both at the end where the slat movement is downward and the end where the slat movement is upward. The radius increases towards the lower portion of the sorter apparatus at both the moveable and fixed ends of the sorter assembly. It has further been found that extension 280, which extends the end track to be overlaying a portion of lower track 164, further reduces audible noise. While one configuration of an end track having a series of unequal radii is illustrated herein, other examples may suggest themselves to the skilled artisan as set forth in International Publication WO 02/26602 A2, the disclosure of which is hereby incorporated herein by reference.

Sorter assembly 10 may additionally include a feed conveyor 282 (FIGS. 40–46). Feed conveyor 282 includes a frame 284, an endless conveyor belt 286 and a drive assembly 288 for driving conveyor belt 286. In a drive position illustrated in FIG. 41, the drive assembly is affixed to frame 284 in a manner that the belt is in tension around a take-up assembly 290. In such position, belt 286 is reeved approximately 180 degrees around drive roller 292 of drive assembly 288 in order to provide good frictional contact between the drive roller and the belt.

Drive roller 292 is driven by an electric motor 294 and a gear reducer 296 through a transmission device such as a cog belt 298. Frame 280 includes an upper belt support plate 300, a pair of side channels 302, and a cross-brace 304. In the illustrative embodiment, cross-brace 304 is also a part of the drive assembly 288. Feed conveyor 282 will be supported in a conventional manner, such as suspended by the ceiling or supported by legs (not shown). Additionally, side channels 302 may be connected with horizontal members 150 through connection with support flanges 271 in order to maintain a consistent relationship between the feed conveyor and the conveying surface 11. Belt 286 is reeved at the rear of belt support plate 300 by a idler roller 306 and in the front by a series of bearings 308 which are supported by a shaft 310. In the illustrative embodiment, shaft 310 is distorted in a bowed fashion in a way that the bearings 308 are more forward the closer to the centerline of the feed conveyor. This simulates a crowned pulley and therefore provides tracking to keep belt 286 centered on the belt support plate.

In order to change the belt 286, drive assembly 288 may be displaced from its operating position, such as by the removal of several bolts holding cross-brace 304 to side channels 302. With the drive assembly removed in this fashion, belt 286 is sufficiently slack to allow it to be slid over side channels 302. Thus, with the supports (not shown) for the feed conveyor disconnected at one lateral side thereof and the drive assembly 280 moved from the operative position, the belt may be easily removed and replaced. While this feature is especially useful for sortation systems, which are at a central flow point in the system and therefore cannot be conveniently down for maintenance for extended periods of time, the unique features of feed conveyor 282 may have applications in other locations of the conveyor system. Although drive assembly 288 is illustrated as being removable by removing the cross-brace, other techniques would suggest themselves for moving the drive assembly out of the operative position, such as hinges and other fastener arrangements. Also, although the invention is illustrated with a single belt, it could also be utilized with a series of narrow strip belts.

Sortation system 10 may also include a product-handling conveyor 312. Product handling convey 312, in the illustrative embodiment, is for removing product from the conveying surface that has not been diverted to one of the take-away conveyors 216. Product handling conveyor 312 includes a flexible body 314 defining a conveying surface such as by a series of conveyor rollers 316. Flexible body 314 includes an inner end 318 that is moveable with take-up assemblies 131. As previously set forth, take-up assemblies 131 are independently operable in order to maintain a particular tension of the endless web 12. Because the take-ups are independent of each other, it is possible for one take-up to be at a more extended position than the other take-up assembly (FIG. 50). Moreover, both of the take-up assemblies are capable of moving within a range of extended positions. Accordingly, as the take-up assemblies move throughout their ranges of adjustment, the ability of inner end 318 to move with the take-up assemblies and the flexible body 314 of the product handling conveyor accommodates this offset movement while continuing to remove product off the conveying surface 11.

Figure 47:
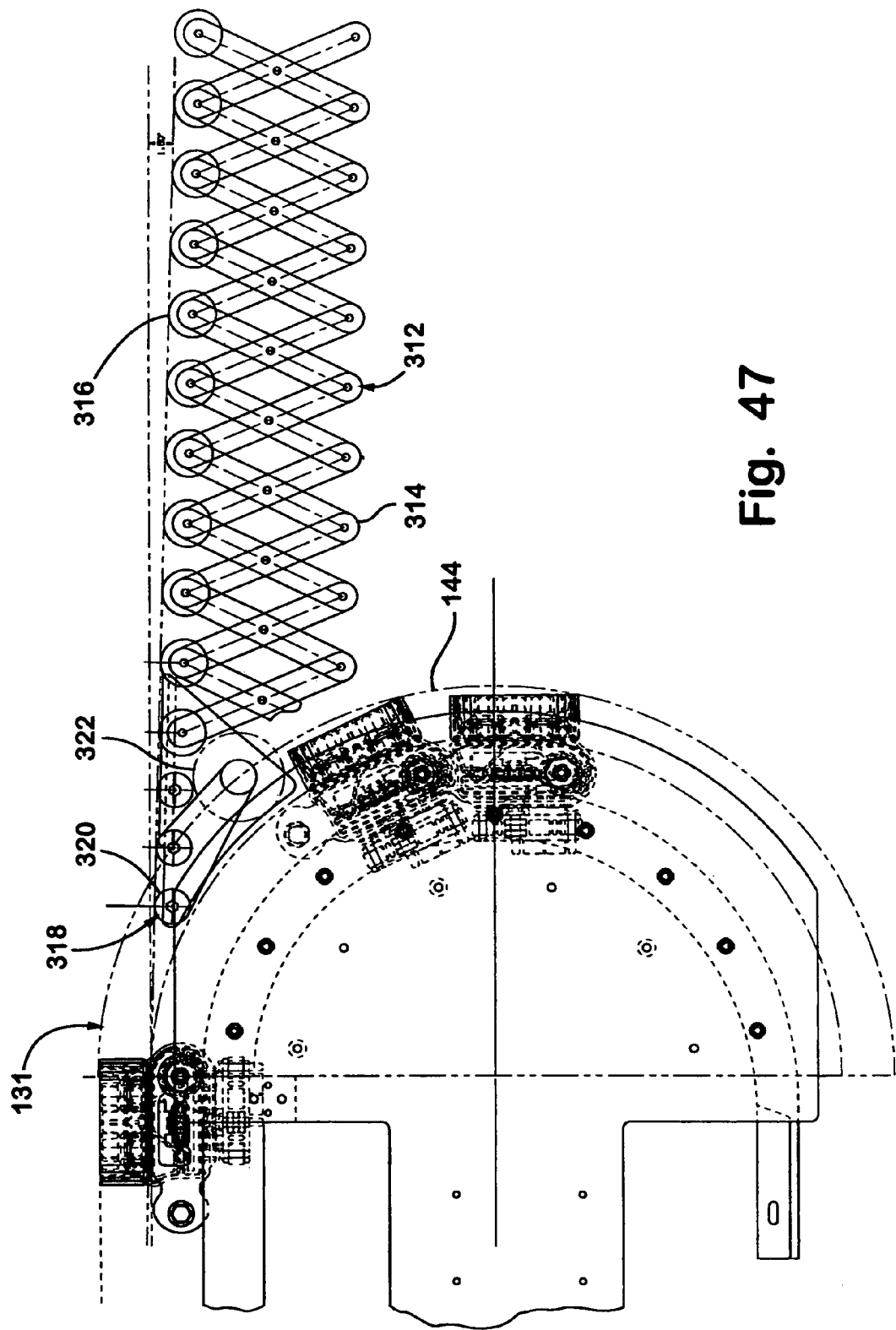
FIG. 47 is a side elevation of a take-away conveyor.
Figure 48:
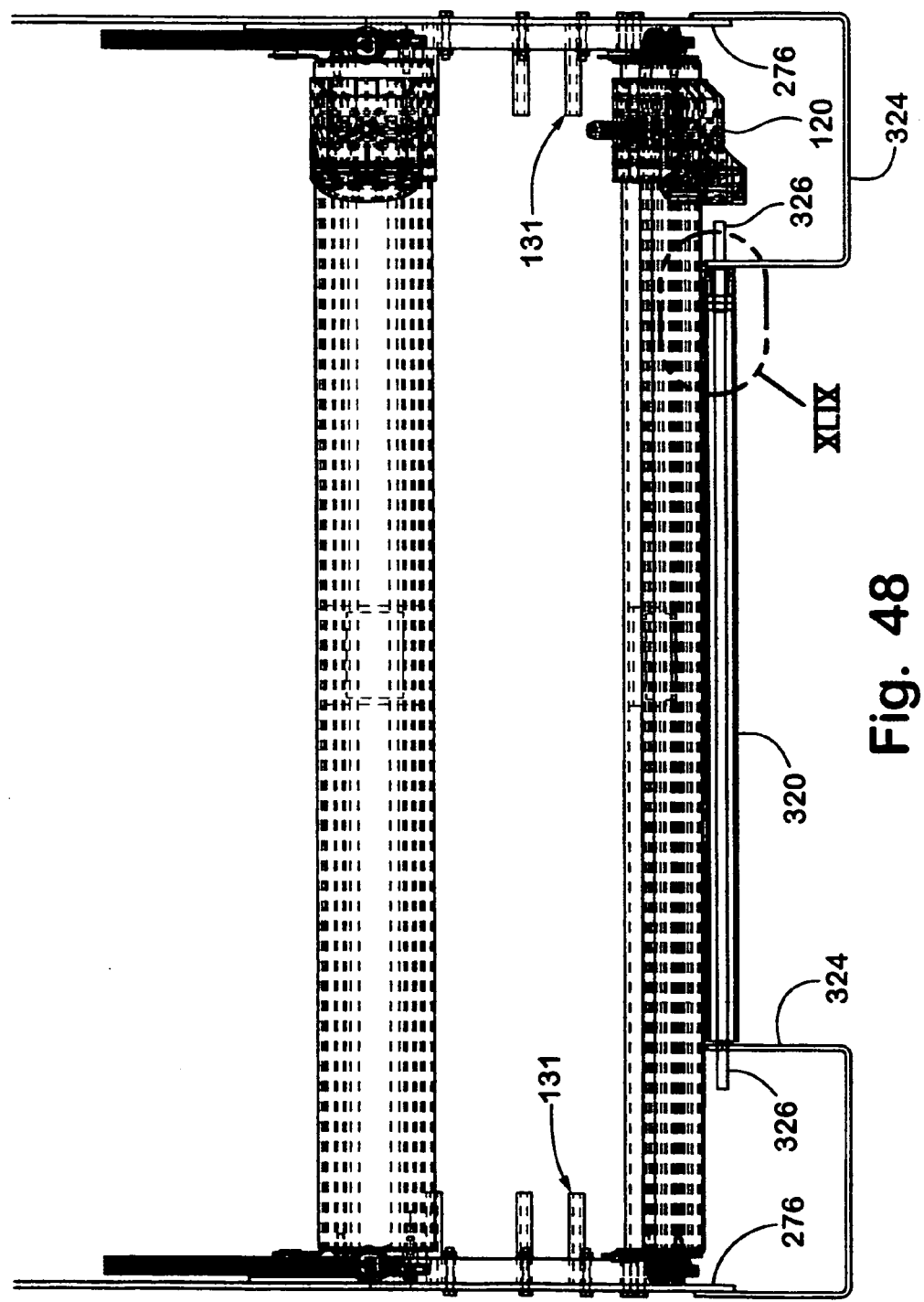
FIG. 48 is a top plan view of the take-away conveyor in FIG. 47.

Product handling conveyor 312 may include an inner powered roller 320 which is driven by a motor 322 such as through an o-ring or other power transfer member. Motor 322, as illustrated, operates both the innermost power roller and the next outermost roller in the direction of rotation of web 12 in order to provide a pair of powered rollers. The purpose of powered roller 320 is in order to ensure that product, especially small product, does not get impeded by engaging a side of the roller. Thus, a product engaging a side of powered roller 320 will tend to be pulled up onto the powered roller by the rotation of the roller, which as illustrated in FIG. 47 is clockwise. Although illustrated as a freely rotating roller driven by a separate motor, powered roller 320 may also be driven through a motor that is internal to roller 320, as is known in the art.

Flexible body inner end 318 is moveable with the take-up assemblies by way of a pair of brackets 324 which are fastened to a portion of both take-up assemblies such as the support 276. Alternatively, some other technique, such as a biasing of the flexible body against the conveying surface 11 or some other electrical positioning control, may be utilized to cause inner end 318 to move with the take-up assemblies. Bracket 324 provides a mount for powered roller 320 as well as one or more of the other rollers of flexible body 314. In this manner, as the take-up assemblies move, the powered roller 320 will remain in close proximity to conveying surface 11 and flexible body 314 will be repositioned to accommodate the movement of powered roller 320 with respect to a fixed position take-away, such as a conveyor, chute, or the like (not shown), at a discharge end of flexible body 314. Powered roller 320 includes a shaft 326 which engages an opening in the corresponding bracket 324. In the illustrative embodiment, shaft 326 passes entirely through the power roller but may, alternatively, be a stub-axle at each end of the roller. In the illustrative embodiment, an outer support cartridge 328 includes a pair of bearings 330 and a groove 332 for accepting a drive ring 334 which is driven by motor 322. In the illustrative embodiments, brackets 324 are enlarged. The purpose of this enlargement is in order to accommodate movement of pusher shoes 126 as they pass around the end of the web.

FIG. 50 illustrates the manner in which powered roller 320, and hence product-handling conveyor 312, may be able to move within a range in unison with the take-up assemblies out of a perfectly lateral orientation perpendicular to the side rails 150. In the illustrative embodiment, the lower bracket 324 is shown offset from the upper bracket 324 by an offset dimension OF. The powered roller 320 may be angled, or skewed, with respect to the normal position by an angle beta. In the illustrative embodiment, an offset OF of six inches or more and a skew angle of eight degrees or more may be accommodated. In certain applications, an offset OF of up to twelve inches or more and a skew angle of up to thirteen degrees or more may be accommodated. Other parameters will be established according to the particular application. However, the ability to achieve such offsets and skews is especially helpful for extremely long sorter conveying surfaces which are subject to a greater degree of adjustment to the web resulting in independent movement of the take-up assemblies. In the illustrative embodiment, product-handling conveyor 312 is a take-away conveyor. This is because the take-up assemblies are at the discharge end of the sortation apparatus. However, if the take-up assemblies are positioned at the feed end of the sortation apparatus, then product-handling conveyor 312 may be a feed conveyor. Likewise, although conveying surface 316 is illustrated as a gravity roller system, other techniques may be utilized, such as powered rollers or a mesh, or the like, in order to provide a powered conveying surface. In the illustrative embodiment, flexible body 314 is commercially available and marketed by Nestaflex under Model 275.

Changes and modifications in the specifically described embodiments can be carried out without departing from the principles of the invention which is intended to be limited only by the scope of the appended claims, as interpreted according to the principles of patent law including the doctrine of equivalents.

We claim:

1. A positive displacement sorter apparatus, comprising:
   a plurality of interconnected slats defining an endless web, an upper run of said web defining a conveying surface conveying articles in a longitudinal direction;
   a plurality of pusher shoes, each moving along at least one of said plurality of slats to laterally displace articles on said conveying surface;
   at least one diverting rail extending diagonally under said conveying surface;
   at least one diverter associated with said at least one diverting rail;
   wherein at least one of said pusher shoes includes a base and a member extending from said base below said conveying surface;
   wherein said member comprises a bearing engaging one of said diverting rails and a pin extending below said bearing;
   wherein said at least one diverter includes an actuator, said actuator adapted to selectively actuating said member toward said at least one diverting rail;
   wherein said at least one diverting rail has a terminal portion opposite said at least one diverter wherein said terminal portion comprises an upper curved surface engaging said bearing and a lower curved surface engaging said pin, said upper curved surface directing said bearing in said longitudinal direction and said lower curved surface directing said pin in said longitudinal direction.

2. The sorter apparatus of claim 1 wherein said at least one diverter comprises a plurality of diverters and said at least one diverting rail comprises a plurality of diverting rails and wherein said diverters and said diverting rails are configured to divert product at least initially without rotation of the product.

3. The sorter apparatus of claim 1 including a return rail assembly, said return rail assembly returning diverted ones of said pusher shoes to an undiverted position, said return rail assembly formed with at least one curve to reduce noise of the returning pusher shoes.

4. The sorter apparatus of claim 1 wherein said upper curved surface and said lower curved surface define spaced apart surface portions and wherein said bearing and said pin pass between said spaced apart surface portions.

5. A positive displacement sorter apparatus, comprising:
   a frame having at least one longitudinally extending frame member defining a longitudinal channel parallel with said frame member;
   a plurality of interconnected slats defining an endless web supported at said frame, an upper run of said web defining a conveying surface conveying articles in a longitudinal direction;
   a plurality of pusher shoes, each moving along at least one of said plurality of slats to laterally displace articles on said conveying surface;
   at least one diverting rail extending diagonally under said conveying surface and at least one diverter associated with said at least one diverting rail;
   wherein at least one of said pusher shoes include a base and a member extending from said base below said conveying surface wherein said member comprises a transfer assembly having at least one roller adapter to engage said at least one diverting rail and a guide member extending below said at least one roller;
   wherein said at least one diverter includes an actuator, said actuator adapted to selectively actuating said member toward said at least one diverting rail;
   wherein said at least one diverting rail has a terminal portion opposite said at least one diverter and wherein said terminal portion comprises and upper surface shaped as a curve that terminates generally tangentially with said channel and a lower surface shaped as a curve that terminates generally tangentially with said channel, wherein said member is guided by said upper and lower surfaces to direct said member in said longitudinal direction after the associated one of said pusher shoes is moved laterally of said conveying surface, thereby reducing audible noise at the end of a divert, wherein said upper surface engages said at least one roller and wherein said lower surface engages said guide member.

6. The sorter apparatus of claim 5 wherein said guide member is at least one chosen from an elongated vane and a pin.

7. The sorter apparatus of claim 5 wherein said upper surface and said lower surface define spaced apart surface portions and wherein said member passes between said spaced apart surface portions.

8. The sorter apparatus of claim 5 wherein said at least one diverter comprises a plurality of diverters and said at least one diverting rail comprises a plurality of diverting rails and wherein said diverters are controlled in a manner to actuate at least two of said members to different ones of said diverting rails to divert product at least initially without rotation of the product.

9. The sorter apparatus of claim 5 including a return rail assembly, said return rail assembly returning diverted ones of said pusher shoes to an undiverted position, said return rail assembly formed with at least one curve to reduce noise of the returning pusher shoes.

10. The sorter apparatus of claim 9 wherein said return rail assembly is formed with at least two curves.

11. A positive displacement sorter apparatus, comprising:
a frame having at least one longitudinally extending frame member defining a longitudinal channel parallel with said frame member;
a plurality of interconnected slats defining an endless web supported at said frame, an upper run of said web defining a conveying surface conveying articles in a longitudinal direction;
a plurality of pusher shoes, each moving along at least one of said plurality of slats to laterally displace articles on said conveying surface;
at least one diverting rail extending diagonally under said conveying surface and at least one diverter associated with said at least one diverting rail;
wherein at least one of said pusher shoes include a base and a member extending from said base below said conveying surface wherein said member comprises a bearing adapted to engage said at least one diverting rail and a pin extending below said bearing;
wherein said at least one diverter includes an actuator, said actuator adapted to selectively actuating said member toward said at least one diverting rail;
wherein said at least one diverting rail has a terminal portion opposite said at least one diverter and wherein said terminal portion comprises and upper surface shaped as a curve that terminates generally tangentially with said channel and a lower surface shaped as a curve that terminates generally tangentially with said channel, wherein said member is guided by said upper and lower surfaces to direct said member in said longitudinal direction after the associated one of said pusher shoes is moved laterally of said conveying surface, thereby reducing audible noise at the end of a divert, wherein said upper surface engages said bearing and wherein said lower surface engages said pin.

12. The sorter apparatus of claim 11 wherein said at least one diverter comprises a plurality of diverters and said at least one diverting rail comprises a plurality of diverting rails and wherein said diverters are controlled in a manner to actuate at least two of said members to different ones of said diverting rails to divert product at least initially without rotation of the product.

13. The sorter apparatus of claim 11 including a return rail assembly, said return rail assembly returning diverted ones of said pusher shoes to an undiverted position, said return rail assembly formed with at least one curve to reduce noise of the returning pusher shoes.

14. The sorter apparatus of claim 13 wherein said return rail assembly is formed with at least two curves.

15. The sorter apparatus of claim 11 wherein said upper surface and said lower surface define spaced apart surface portions and wherein said member passes between said spaced apart surface portions.

16. A positive displacement sorter apparatus, comprising:
a frame having at least one longitudinally extending frame member defining a longitudinal channel parallel with said frame member;
a plurality of interconnected slats defining an endless web supported at said frame, an upper run of said web defining a conveying surface conveying articles in a longitudinal direction;
a plurality of pusher shoes, each moving along at least one of said plurality of slats to laterally displace articles on said conveying surface;
a divert assembly comprising a plurality of diverting rails extending diagonally under said conveying surface and a plurality of diverters each associated with one of said diverting rails, at least two of said diverting rails spaced apart no more than the longitudinal spacing between said pusher shoes;
wherein each of said pusher shoes includes a base and member extending from said base below said conveying surface;
wherein each of said diverters includes an actuator, said actuator adapted to selectively actuating one of said members toward the associated one of said diverting rails;
wherein each of said diverting rails has a terminal portion opposite said at least one diverter and wherein said terminal portion comprises an upper pair of spaced apart surfaces shaped as curves that terminate generally tangentially with said channel and a lower pair of spaced apart surfaces shaped as curves that terminate generally tangentially with said channel, wherein said member passes between said upper and lower pairs of surfaces to direct said member in said longitudinal direction after moving the associated pusher shoe laterally of said conveying surface, thereby reducing audible noise at the end of a divert.

17. The sorter apparatus of claim 16 wherein said diverters are controlled in a manner to actuate at least two of said members to different ones of said diverting rails to divert an article at least initially without rotation of that article.

18. The sorter apparatus of claim 16 including a return rail assembly, said return rail assembly returning diverted ones of said pusher shoes to an undiverted position, said return rail assembly formed with at least one curve to reduce noise of the returning pusher shoes.

19. The sorter apparatus of claim 16 wherein said member comprises a bearing engaging one of said diverting rails and a pin extending below said bearing.

20. The sorter apparatus of claim 19 wherein said upper pair of spaced apart surfaces engage said bearing and wherein said lower pair of spaced apart surfaces engage said pin.

* * * * *

UNITED STATES PATENT AND TRADEMARK OFFICE
CERTIFICATE OF CORRECTION

PATENT NO. : 7,117,988 B2
APPLICATION NO. : 11/057010
DATED : October 10, 2006
INVENTOR(S) : Frank W. Veit et al.

It is certified that error appears in the above-identified patent and that said Letters Patent is hereby corrected as shown below:

On the Title Page
Item (74) *Attorney, Agent or Firm*:
"Limm" should be --Linn--.

Column 2:
Line 4, "includus" should be --includes--.
Line 12, "the" should be --The--.

Column 5:
Line 32, "WS" should be --$W_s$--.

Column 6:
Line 59, "et Al" should be --et al.--.

Column 7:
Line 3, "low-function" should be --low-friction--.

Column 8:
Line 10, "multipie" should be --multiple--.

Column 14:
Line 24, Claim 5, "adapter" should be --adapted--.
Line 32, Claim 5, "and" should be --an--.

UNITED STATES PATENT AND TRADEMARK OFFICE
CERTIFICATE OF CORRECTION

PATENT NO. : 7,117,988 B2
APPLICATION NO. : 11/057010
DATED : October 10, 2006
INVENTOR(S) : Frank W. Veit et al.

It is certified that error appears in the above-identified patent and that said Letters Patent is hereby corrected as shown below:

Column 15:
Line 21, Claim 11, "member" should be --members--.
Line 25, Claim 11, "and" should be --an--.

Signed and Sealed this

Twelfth Day of August, 2008

JON W. DUDAS
*Director of the United States Patent and Trademark Office*